(12) United States Patent
Chen-Ho et al.

(10) Patent No.: US 11,493,674 B2
(45) Date of Patent: Nov. 8, 2022

(54) RETROREFLECTIVE ARTICLE COMPRISING EMBEDDED REFLECTIVE LAYERS

(71) Applicant: 3M INNOVATIVE PROPERTIES COMPANY, St. Paul, MN (US)

(72) Inventors: Kui Chen-Ho, Woodbury, MN (US); Ann M. Gilman, Bayport, MN (US); Kevin W. Gotrik, Hudson, WI (US); Scott J. Jones, Woodbury, MN (US); Daniel M. Lentz, Cottage Grove, MN (US); Michael A. McCoy, St. Paul, MN (US); Shri Niwas, Maple Grove, MN (US); Matthew S. Stay, Minneapolis, MN (US); Ramasubramani Kuduva Raman Thanumoorthy, Woodbury, MN (US); Ying Xia, Woodbury, MN (US)

(73) Assignee: 3M Innovative Properties Company, Monroe, NC (US)

( * ) Notice: Subject to any disclaimer, the term of this patent is extended or adjusted under 35 U.S.C. 154(b) by 43 days.

(21) Appl. No.: 15/733,032

(22) PCT Filed: Oct. 25, 2018

(86) PCT No.: PCT/US2018/057561
§ 371 (c)(1),
(2) Date: Apr. 24, 2020

(87) PCT Pub. No.: WO2019/084302
PCT Pub. Date: May 2, 2019

(65) Prior Publication Data
US 2020/0264349 A1    Aug. 20, 2020

Related U.S. Application Data

(60) Provisional application No. 62/739,489, filed on Oct. 1, 2018, provisional application No. 62/578,343, filed on Oct. 27, 2017.

(51) Int. Cl.
*G02B 5/128* (2006.01)
*A41D 31/32* (2019.01)

(52) U.S. Cl.
CPC .......... *G02B 5/128* (2013.01); *A41D 31/325* (2019.02)

(58) Field of Classification Search
CPC ........ G02B 5/128; G02B 5/12; G02B 3/0037; A41D 31/325
See application file for complete search history.

(56) References Cited

U.S. PATENT DOCUMENTS

| 1,175,224 A | 4/1916 | Bleecker |
| 2,461,011 A | 2/1949 | Taylor |

(Continued)

FOREIGN PATENT DOCUMENTS

| CN | 201510036347 | 5/2015 |
| CN | 201520041869 | 10/2015 |

(Continued)

OTHER PUBLICATIONS

"Brilliant Silver Foil 212", Foil Stamp Solutions [retrieved from the internet on Jun. 23, 2020], URL http://foilstampsolutions.com/foils/hot-stamp-foil/brillant-Silver-foil-212/, 2020, pp. 1-2.

(Continued)

*Primary Examiner* — Nancy R Johnson
(74) *Attorney, Agent, or Firm* — Kenneth B. Wood

(57) ABSTRACT

A retroreflective article including a binder layer and a plurality of retroreflective elements. Each retroreflective element includes a transparent microsphere partially embedded in the binder layer. At least some of the retroreflective elements include a reflective layer that is embedded between the transparent microsphere and the binder layer. At least some of the embedded reflective layers are localized reflective layers.

20 Claims, 11 Drawing Sheets

(56) References Cited

U.S. PATENT DOCUMENTS

| | | | |
|---|---|---|---|
| 2,543,800 A | 3/1951 | Palmquist |
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,963,378 A | 12/1960 | Palmquist |
| 2,965,921 A | 12/1960 | Bland |
| 2,992,122 A | 7/1961 | Beck |
| 3,228,897 A | 1/1966 | Nellessen |
| 3,294,559 A | 12/1966 | Searight |
| 3,468,681 A | 9/1969 | Jaupain |
| 3,700,305 A | 10/1972 | Bingham |
| 3,758,192 A | 9/1973 | Bingham |
| 3,946,130 A | 3/1976 | Tung |
| 3,989,775 A | 11/1976 | Jack |
| 4,192,576 A | 3/1980 | Tung |
| 4,367,919 A | 1/1983 | Tung |
| 4,564,556 A | 1/1986 | Lange |
| 4,758,469 A | 7/1988 | Lange |
| 4,763,985 A | 8/1988 | Bingham |
| 4,772,511 A | 9/1988 | Wood |
| 4,897,136 A | 1/1990 | Bailey |
| 4,931,414 A | 6/1990 | Wood |
| 5,064,272 A | 11/1991 | Bailey |
| 5,200,262 A | 4/1993 | Li |
| 5,223,276 A | 6/1993 | Djordjevic |
| 5,286,682 A | 2/1994 | Jacobs |
| 5,344,705 A | 9/1994 | Olsen |
| 5,510,178 A | 4/1996 | Olsen |
| 5,631,064 A | 5/1997 | Marecki |
| 5,645,938 A | 7/1997 | Crandall |
| 5,866,236 A | 2/1999 | Faykish |
| 5,962,121 A | 10/1999 | Mori |
| 5,976,669 A | 11/1999 | Fleming |
| 6,153,128 A | 11/2000 | Lightle |
| 6,172,810 B1 | 1/2001 | Fleming |
| 6,224,219 B1 | 5/2001 | Feming |
| 6,243,201 B1 | 6/2001 | Fleming |
| 6,306,459 B1 | 10/2001 | Fleming |
| 6,350,034 B1 | 2/2002 | Fleming |
| 6,355,302 B1 | 3/2002 | Vanderberg |
| 6,361,850 B1 | 3/2002 | Billingsley |
| 6,416,856 B1 | 7/2002 | Crandall |
| 7,018,713 B2 | 3/2006 | Padiyath |
| 7,140,741 B2 | 11/2006 | Fleming |
| 7,175,901 B1 | 2/2007 | Sagar |
| 7,651,557 B2 | 1/2010 | Burns |
| 8,234,998 B2 | 8/2012 | Krogman |
| 8,470,394 B2 | 6/2013 | Koppes |
| 8,658,248 B2 | 2/2014 | Anderson |
| 8,851,688 B2 | 10/2014 | Huang |
| 9,234,990 B2 | 1/2016 | Huang |
| 9,248,470 B2 | 2/2016 | Koppes |
| 9,327,441 B2 | 5/2016 | Ulcej |
| 9,671,533 B2 | 6/2017 | Hannington |
| 2001/0026860 A1 | 10/2001 | Benson |
| 2006/0237124 A1 | 10/2006 | Bartoli et al. |
| 2009/0035520 A1 | 2/2009 | Sagar |
| 2009/0142486 A1 | 6/2009 | Hannington |
| 2010/0316852 A1 | 12/2010 | Condo |
| 2011/0292508 A1 | 12/2011 | Huang |
| 2011/0293858 A1* | 12/2011 | Xu ........................... C08K 9/02 428/29 |
| 2012/0019607 A1 | 1/2012 | Dunn |
| 2013/0273242 A1 | 10/2013 | Krogman |
| 2016/0102432 A1 | 4/2016 | Chen |
| 2016/0170104 A1 | 6/2016 | Nand |
| 2016/0245966 A1 | 8/2016 | Edwards |
| 2017/0131444 A1 | 5/2017 | Xia |
| 2017/0192142 A1 | 7/2017 | Niwas |
| 2017/0276844 A1 | 9/2017 | McCoy |
| 2017/0293056 A1 | 10/2017 | Chen-Ho |

FOREIGN PATENT DOCUMENTS

| | | |
|---|---|---|
| DE | 102004025325 | 12/2005 |
| EP | 0 404 539 | 12/1990 |
| EP | 0512668 | 11/1992 |
| GB | 0962570 | 7/1964 |
| GB | 1036392 | 7/1966 |
| GB | 1447585 | 8/1976 |
| GB | 2433637 | 6/2007 |
| WO | WO 1996-016343 | 5/1996 |
| WO | WO 1998-028642 | 7/1998 |
| WO | WO 1999-036248 | 7/1999 |
| WO | WO 2001/029587 | 4/2001 |
| WO | WO 2001-042823 | 6/2001 |
| WO | WO 2010/006102 | 1/2010 |
| WO | WO 2015-061065 | 4/2015 |
| WO | WO 2015-167947 | 11/2015 |
| WO | WO 2015-171406 | 11/2015 |
| WO | WO 2015-175024 | 11/2015 |
| WO | WO 2016-039820 | 3/2016 |
| WO | WO 2016-053734 | 4/2016 |
| WO | WO 2018-151759 | 8/2018 |
| WO | WO 2018-151760 | 8/2018 |
| WO | WO 2018-178802 | 10/2018 |
| WO | WO 2018-178803 | 10/2018 |
| WO | WO 2019-084287 | 5/2019 |
| WO | WO 2019-084295 | 5/2019 |
| WO | WO 2019-084297 | 5/2019 |
| WO | WO 2019-084299 | 5/2019 |
| WO | WO 2019-084302 | 5/2019 |

OTHER PUBLICATIONS

Goldstein, "Backscattered Electrons", Chapter 2 of Scanning Electron Microscopy and X-Ray Microanalysis, 4th Edition, 2018, pp. 15-28.
Decher, "Fuzzy Nanoassemblies: Toward Layered Polymeric Multicomposites", Science, 1997, vol. 227, pp. 1232-1237.
Iler, "Multilayers of Colloidal Particles", Journal of Colloid And Interface Science, 1966, vol. 21, No. 6, pp. 569-594.
Krogman, "Automated Process for Improved Uniformity and Versatility of Layer-by-Layer Deposition", Langmuir, 2007, vol. 23, pp. 3137-3141.
Schroder, "Broadcast photonic curing of metallic nanoparticle films", NSTI—Nanotech 2006, vol. 3, pp. 198-201.
Seyrek, "Layer-by-Layer Assembly of Multifunctional Hybrid Mateirals and Nanoscale Devices", Polymer Science: A Comprehensive Reference, 2012, vol. 7, pp. 159-185.
International Search report for PCT International Application No. PCT/US2018/057561 dated Jan. 25, 2019, 5 pages.

* cited by examiner

RETROREFLECTIVE ARTICLE COMPRISING EMBEDDED REFLECTIVE LAYERS

CROSS REFERENCE TO RELATED APPLICATIONS

This application is a national stage filing under 35 U.S.C. 371 of PCT/US2018/057561, filed Oct. 25, 2018, which claims the benefit of provisional Application No. 62/739,489, filed Oct. 1, 2018, and provisional Application No. 62/578,343, filed Oct. 27, 2017, the disclosure of which is incorporated by reference in its/their entirety herein.

BACKGROUND

Retroreflective materials have been developed for a variety of applications. Such materials are often used e.g. as high visibility trim materials in clothing to increase the visibility of the wearer. For example, such materials are often added to garments that are worn by firefighters, rescue personnel, road workers, and the like.

SUMMARY

In broad summary, herein is disclosed a retroreflective article comprising a binder layer and a plurality of retroreflective elements. Each retroreflective element comprises a transparent microsphere partially embedded in the binder layer. At least some of the retroreflective elements comprise a reflective layer that is embedded between the transparent microsphere and the binder layer. At least some of the embedded reflective layers are localized reflective layers. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 9b is a scanning electron microscope backscattered-electron 200× photograph of the same portion of a Working Example article as FIG. 9a.

FIG. 10b is a scanning electron microscope backscattered-electron 500× photograph of the same portion of a Working Example article as FIG. 10a.

FIG. 11b is a scanning electron microscope backscattered-electron 1000× photograph of the same portion of a Working Example article as FIG. 11a.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all non-photographic figures and drawings in this document are not to scale and are chosen for the purpose of illustrating different embodiments of the invention. In particular the dimensions of the various components are depicted in illustrative terms only, and no relationship between the dimensions, relative curvatures, etc. of the various components should be inferred from the drawings, unless so indicated.

Figure 1:
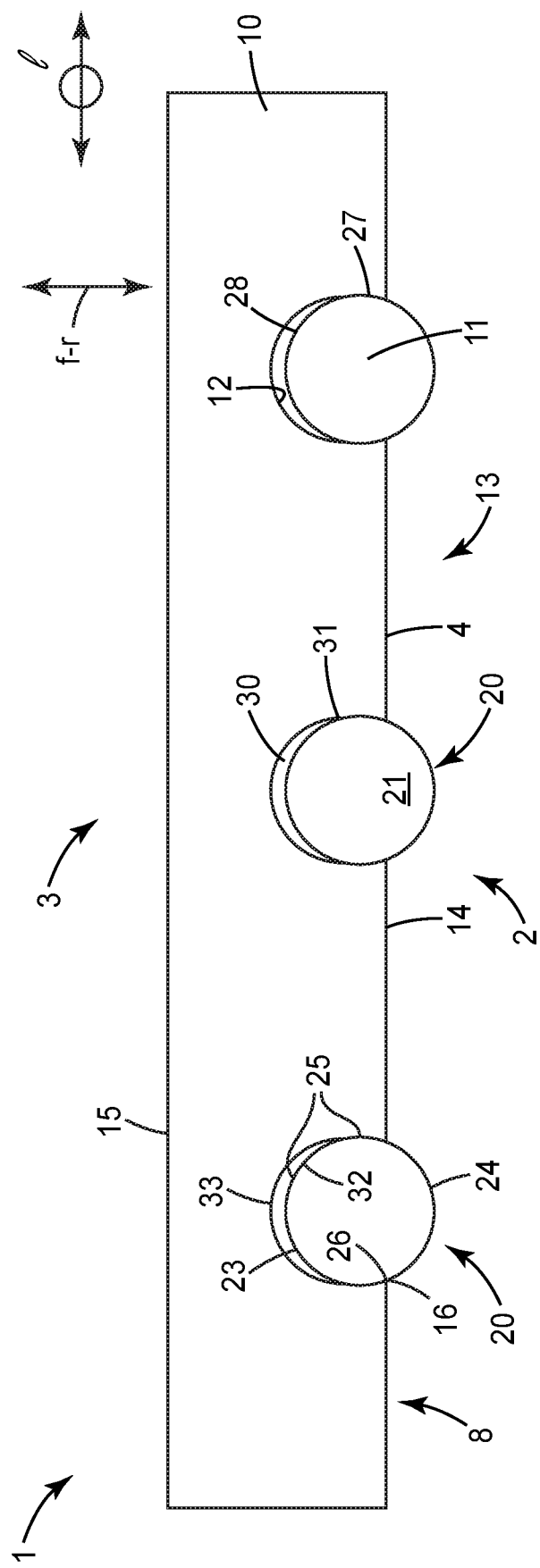
FIG. 1 is a side schematic cross sectional view of an exemplary retroreflective article.

As used herein, terms such as "front", "forward", and the like, refer to the side from which a retroreflective article is to be viewed. Terms such as "rear", "rearward", and the like, refer to an opposing side, e.g. a side that is to be coupled to a garment. The term "lateral" refers to any direction that is perpendicular to the front-rear direction of the article, and includes directions along both the length and the breadth of the article. The front-rear direction (f-r), and exemplary lateral directions (l) of an exemplary article are indicated in FIG. 1.

Terms such as disposed, on, upon, atop, between, behind, adjacent, contact, proximate, and the like, do not require that a first entity (e.g. a layer) must necessarily be in direct contact with a second entity (e.g. a second layer) that the first entity is e.g. disposed on, behind, adjacent, or in contact with. Rather, such terminology is used for convenience of description and allows for the presence of an additional entity (e.g. a layer such as a bonding layer) or entities therebetween, as will be clear from the discussions herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 10 degrees. The term "substantially", unless otherwise specifically defined, means to a high degree of approximation (e.g., within +/−10% for quantifiable properties). For angular orientations, the term "substantially" means within clockwise or counterclockwise 5 degrees. The term "essentially" means to a very high degree of approximation (e.g., within plus or minus 2% for quantifiable properties; within plus or minus 2 degrees for angular orientations); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter. All averages referred to herein are number-average unless otherwise specified.

DETAILED DESCRIPTION

FIG. 1 illustrates a retroreflective article 1 in exemplary embodiment. As shown in FIG. 1, article 1 comprises a binder layer 10 that comprises a plurality of retroreflective elements 20 spaced over the length and breadth of a front side of binder layer 10. Each retroreflective element comprises a transparent microsphere 21 that is partially embedded in binder layer 10 so that the microspheres 21 are partially exposed and define a front (viewing) side 2 of the article. The transparent microspheres thus each have an embedded area 25 that is seated in a receiving cavity 11 of binder layer 10, and an exposed area 24 that is exposed (protrudes) forwardly of major front surface 14 of binder layer 10. In some embodiments, the exposed areas 24 of microspheres 21 of article 1 are exposed to an ambient atmosphere (e.g., air) in the final article as-used, rather than being e.g. covered with any kind of cover layer or the like. Such an article will be termed an exposed-lens retroreflective article. In various embodiments, a microsphere may be partially embedded in the binder layer so that on average, from 15, 20 or 30 percent of the diameter of the microsphere, to about 80, 70, 60 or 50 percent of the diameter of the microsphere, is embedded within binder layer 10. In many embodiments, a microsphere may be partially embedded in the binder layer so that, on average, from 50 percent to 80 percent of the diameter of the microsphere is embedded within binder layer 10.

A retroreflective element 20 will comprise a reflective layer 30 disposed between the transparent microsphere 21 of the retroreflective element and the binder layer 10. The microspheres 21 and the reflective layers 30 collectively return a substantial quantity of incident light towards a source of light that impinges on front side 2 of article 1. That is, light that strikes the retroreflective article's front side 2 passes into and through a microsphere 21 and is reflected by the reflective layer 30 to again reenter the microsphere 21 such that the light is steered to return toward the light source.

Embedded Reflective Layers

As illustrated in exemplary embodiment in FIG. 1, at least some of the reflective layers 30 of retroreflective elements 20 of retroreflective article 1 will be embedded reflective layers. In various embodiments, at least generally, substantially, or essentially all of the reflective layers 30 of retroreflective elements 20 will be embedded reflective layers (noting that according to the terminology used herein, a transparent microsphere that lacks a reflective layer will not be considered to be a retroreflective element).

An embedded reflective layer 30 is a reflective layer that is disposed adjacent to a portion of an embedded area 25 of a transparent microsphere 21 as shown in exemplary embodiment in FIG. 1. An embedded reflective layer will at least generally conform to a portion (often including a rearmost portion) of the embedded area 25 of a transparent microsphere 21. By definition an embedded reflective layer will be completely surrounded (e.g. sandwiched) by the combination of at least the binder layer 10 and the transparent microsphere 21 (noting that in some embodiments some other layer or layers, e.g. an intervening layer such as a bonding layer and/or a color layer, may also be present in article 1, as discussed later herein, and may contribute to the surrounding of the reflective layer). In other words, the minor edges 31 of the reflective layer (as depicted in exemplary embodiment in FIG. 1) will be "buried" between the transparent microsphere 21 and the binder layer 10 (and possibly other layers) rather than being exposed. That is, the locations 26 that mark the boundary between an exposed area 24 of a microsphere and an embedded area 25 of a microsphere, will be abutted by an edge 16 of binder layer 10 (or an edge of layer disposed thereon) rather than by the minor edge 31 of reflective layer 30.

For a transparent microsphere 21 that comprises an embedded reflective layer 30, no part of embedded reflective layer 30 will be exposed so as to extend onto (i.e., cover) any portion of exposed area 24 of microsphere 21. Microspheres with embedded reflective layers 30 are thus distinguished from arrangements made by "randomized bead" processes in which microspheres are hemispherically coated with reflective layers and are then disposed randomly on a substrate so that numerous microspheres exhibit at least partially exposed reflective layers. Furthermore, retroreflective elements comprising embedded reflective layers 30 as disclosed herein will be distinguished from arrangements in which microspheres that have been coated with reflective layers over the entire surfaces of the microspheres are disposed on a substrate after which reflective layers are removed from exposed areas of the microspheres e.g. by etching. Such arrangements will not result in the reflective areas exhibiting "buried" edges and thus will not produce embedded reflective layers as defined herein.

It will be appreciated that in actual industrial production of retroreflective articles of the general type disclosed herein, small-scale statistical fluctuations may inevitably be present that may result in the formation of a very small number of e.g. minor portions of a reflective layer that exhibit a minor edge or area that is exposed rather than being buried. Such occasional occurrences are to be expected in any real-life production process; however, embedded reflective layers as disclosed herein are distinguished from circumstances in which reflective layers are purposefully arranged in a manner in which they will exhibit a large number of exposed minor edges or areas.

Localized/Bridging Reflective Layers

In some embodiments an embedded reflective layer 30 will be a localized reflective layer. By definition, a localized reflective layer is an embedded reflective layer that does not comprise any portion that extends away from an embedded area 25 of a microsphere 21 along any lateral dimension of article 1 to any significant extent. In particular, a localized reflective layer will not extend laterally to bridge lateral gaps between neighboring transparent microspheres 21. In some embodiments, at least generally, substantially, or essentially all (according to the previously-provided definitions) of the embedded reflective layers 30 will be localized reflective layers. However, in some particular embodiments (e.g. involving laminated reflective layers as discussed later herein) a reflective layer may bridge a lateral gap between neighboring transparent microspheres. In such instances, a reflective layer may be sized and positioned so that a portion of the reflective layer is positioned at least generally rearwardly of a transparent microsphere, and another portion of that same reflective layer is positioned at least generally rearwardly of another, neighboring microsphere. A single reflective layer may thus operate in conjunction with two (or more) transparent microspheres and will be termed a "bridging" reflective layer. Bridging reflective layers are not localized reflective layers as defined herein, however, the perimeter edges of bridging reflective layers are buried between the transparent microspheres and the binder material; bridging reflective layers are thus "embedded" reflective layers. An exemplary bridging reflective layer (which is dark-colored in appearance in this optical photograph) is identified by reference number 36 in the photograph of a Working Example sample present in FIG. 12; this bridging reflective layer appears to bridge three transparent microspheres.

The occurrence of bridging reflective layers seems to be statistically driven and is affected e.g. by lamination conditions (as discussed in detail in U.S. Provisional Patent Application 62/739,506; entitled "RETROREFLECTIVE ARTICLE COMPRISING LOCALLY-LAMINATED REFLECTIVE LAYERS", filed evendate herewith and incorporated by reference in its entirety herein). In some embodiment any such bridging reflective layers, if present, may represent a relatively small fraction of the total number of embedded reflective layers. Thus in some embodiments bridging reflective layers may be present at a level of less than 20, 10, 5, 2 or 1% of the total population of embedded reflective layers. However, in some particular embodiments, bridging reflective layers may represent as much as 20, 30, 40 or even 50% or more of the total population of embedded reflective layers.

Figure 2:
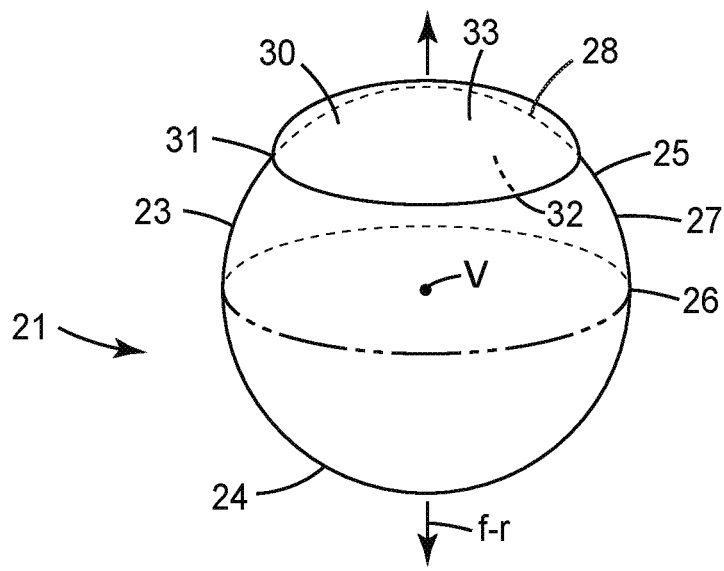
FIG. 2 is an isolated magnified perspective view of a single transparent microsphere and an exemplary embedded, localized reflective layer.
Figure 3:
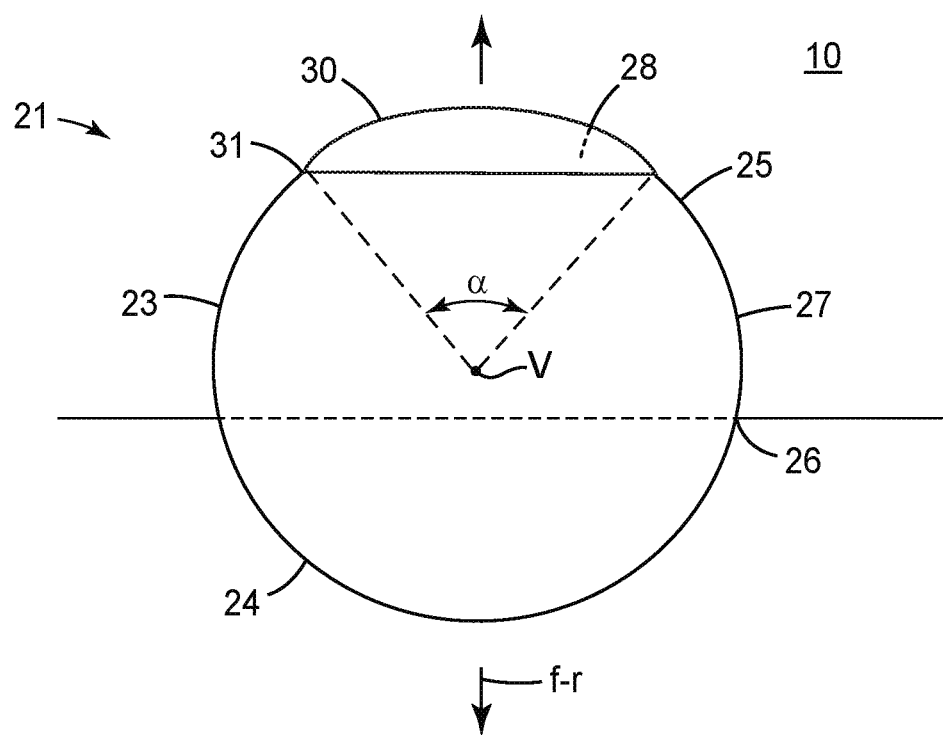
FIG. 3 is an isolated magnified side schematic cross sectional view of a single transparent microsphere and an exemplary embedded, localized reflective layer.

FIG. 2 is a magnified isolated perspective view of a transparent microsphere 21 and an exemplary localized, embedded reflective layer 30, with a binder layer 10 omitted for ease of visualizing reflective layer 30. FIG. 3 is a magnified isolated side schematic cross sectional view of a transparent microsphere and an embedded reflective layer 30. As shown in these Figures, a reflective layer 30 will comprise a major forward surface 32 that often exhibits a generally arcuate shape, e.g. in which at least a portion of forward surface 32 at least generally conforms to a portion of a major rearward surface 23 of microsphere 21. In some embodiments, major forward surface 32 of reflective layer 30 may be in direct contact with major rearward surface 23 of microsphere 21; however, in some embodiments major forward surface 32 of reflective layer 30 may be in contact with a layer that is itself disposed on major rearward surface 23 of microsphere 21, as discussed in further detail later herein. A layer that is disposed in this manner may be, e.g., a transparent layer that serves e.g. as a protective layer, as a tie layer or adhesion-promoting layer; or, such a layer may be a color layer as discussed in detail later herein. A major rearward surface 33 of reflective layer 30 (e.g. a surface that is in contact with forward-facing surface 12 of binder layer 10 as shown in FIG. 1, or a surface of a layer present thereon) may be, but does not necessarily have to be, at least generally congruent with (e.g. locally parallel to) the major forward surface 32 of reflective layer 30. This may depend e.g. on the particular manner in which the reflective layer is disposed on the transparent microspheres, as discussed later herein.

Percent Area Coverage of Reflective Layers

As evident from FIGS. 2 and 3, an embedded reflective layer 30 will be disposed so that it occupies (covers) a portion 28, but not the entirety, of embedded area 25 of microsphere 21. The remainder of embedded area 25 will be area 27 that is not occupied by reflective layer 30. Such arrangements can be characterized in terms of the percentage of embedded area 25 that is covered by reflective layer 30 (regardless of whether layer 30 is in direct contact with area 25 or is separated therefrom by e.g. a tie layer or the like). In various embodiments, a reflective layer, if present on a microsphere, may occupy a covered portion 28 that is at least 5, 10, 20, 30, 40, 50, 60, or 70 percent of embedded area 25 of the microsphere. In further embodiments, a reflective layer, if present, may occupy a covered portion 28 that is at most 95, 85, 75, 60, 55, 45, 35, 25, or 15 percent of embedded area 25. Such calculations will be based on the actual percentage of multi-dimensionally-curved embedded area 25 that is covered by reflective layer 30, rather than using e.g. plane-projected areas. By way of a specific example, the exemplary reflective layer 30 of FIG. 3 occupies a portion 28 that is estimated to be approximately 20-25% of embedded area 25 of microsphere 21.

In some embodiments a reflective layer 30 may be characterized in terms of the percentage of the total surface area of the microsphere (i.e., embedded area 25 plus exposed area 24) that is occupied (covered) by the reflective layer. In various embodiments, a reflective layer, if present on a microsphere, may occupy a covered area that is at least 5, 10, 15, 20, 25, 30 or 35 percent of the total surface area of the microsphere. In further embodiments, a reflective layer, if present, may occupy a covered area that is less than 50, 45, 40, 35, 30, 25, 20, 15, or 10 percent of the total surface area of the microsphere. By way of a specific example, the exemplary reflective layer 30 of FIG. 3 is estimated to occupy an area 28 that is approximately 10-12% of the total surface area of microsphere 21.

Figure 4:
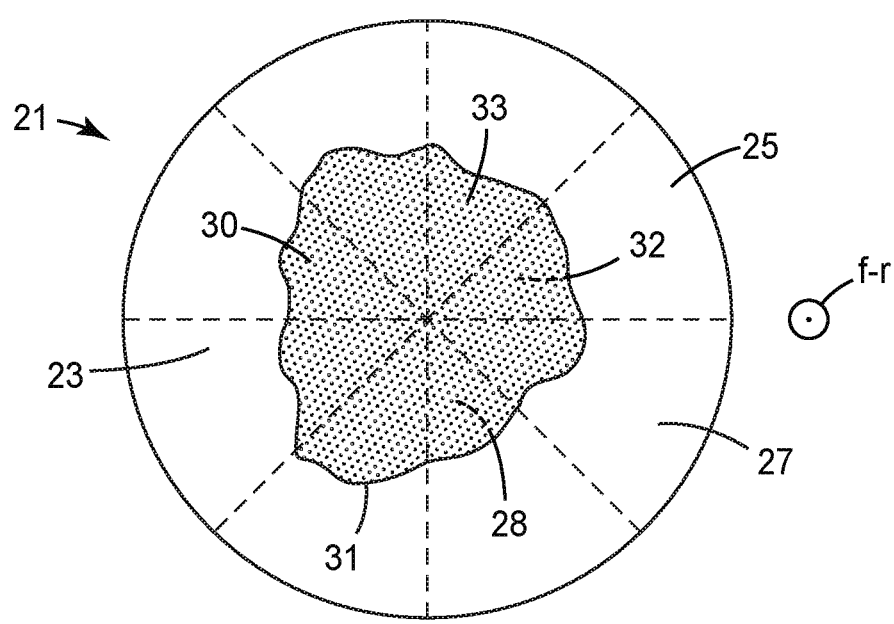
FIG. 4 is an isolated magnified top plan view of a single transparent microsphere and an exemplary embedded, localized reflective layer.

In some embodiments, an embedded reflective layer 30 may be characterized in terms of an angular arc that the reflective layer occupies. For purposes of measurement, such an angular arc a may be taken along a cross-sectional slice of the transparent microsphere (e.g. resulting in a cross-sectional view such as in FIG. 3) and may be measured from a vertex (v) at the geometric center of transparent microsphere 21, as shown in FIG. 3. In various embodiments, an embedded reflective layer 30 may be disposed so that it occupies an angular arc a comprising less than 180, 140, 100, 80, 60, 40 or 30 degrees. In further embodiments, a reflective layer may occupy an angular arc a of at least about 5, 10, 15, 25, 35, 45, 55, 75, 95, or 135 degrees. (By way of specific examples, the exemplary reflective layers 30 of FIG. 1 are estimated to occupy an angular arc a in the range of approximately 150-160 degrees, whereas the exemplary reflective layer 30 of FIG. 3 is estimated to occupy an angular arc a in the range of approximately 80-85 degrees.) As will be made clear by the detailed discussions later herein regarding methods of making embedded reflective layers, in many embodiments an embedded reflective layer 30 may not necessarily be symmetrical (e.g., circular and/or centered on the front-rear centerline of the transparent microsphere) when viewed along the front-rear axis of the transparent microsphere. Rather, in some cases a reflective layer 30 may be non-circular, e.g. oval, irregular, lop-sided, splotchy, etc., in the general manner shown in the generic representation of FIG. 4. Accordingly, if such a reflective layer is to be characterized by an angular arc in the manner described above, an average value of the angular arc will be reported. Such an average value can be obtained, for example, by measuring the angular arc at several (e.g. four) locations spaced around the microsphere (with the microsphere viewed along its front-rear axis) as indicated in FIG. 4 and taking the average of these measurements. (Such methods may also be used to obtain the above-described area percentages.)

For a reflective layer that is symmetrically positioned on a microsphere e.g. as in FIGS. 1-3, the midpoint of any or all such angular arcs may at least substantially coincide with the front-rear axis (centerline) of the microsphere. That is, for a reflective layer that is both symmetrically positioned and is symmetrical shaped, the geometric center of the reflective layer may coincide with the front-rear centerline of the microsphere. However, in some embodiments a reflective layer may be at least slightly offset relative to the front-rear centerline of the microsphere, so that at least some such midpoints may be located e.g. 10, 20, 30, 45, 60, 75, or 85 degrees away from the front-rear centerline of the microsphere.

In additional to any individual reflective layer possibly exhibiting an irregular shape as in FIG. 4, the reflective layers of different microspheres may differ from each other in shape and/or size. For example, in some embodiments reflective layers may conveniently be disposed on microspheres by being transferred to protruding portions thereof, while the microspheres are partially (and temporarily) embedded in a carrier. Since different microspheres may vary slightly in diameter, and/or there may be variations in the depth to which different microspheres are embedded in the carrier, different microspheres may protrude different distances outward from the carrier. In some cases microspheres that protrude further outward from the carrier may receive a greater amount of reflective layer transferred thereto, in comparison to microspheres that are more deeply embedded in the carrier. This being the case, it will be understood that the reflective layers of various microspheres may differ from each other in terms of the angular arc occupied by the reflective layer and/or in terms of the percentage of the embedded area of microsphere (or the percentage of the total area of the microsphere) occupied by the reflective layer.

Such variations notwithstanding, it will be understood that retroreflective elements comprising embedded reflective layers as disclosed herein are distinguished from arrangements in which transparent microspheres that are hemispherically covered with reflective layers are disposed randomly (e.g. by so-called "randomized-bead" processes) onto binder layers. That is, embedded reflective layers as disclosed herein will tend to be clustered on or near the rearmost portion of the microspheres; or, if the reflective layers are offset from this rearmost portion, they will tend to be offset in the same direction. In contrast, randomized-bead approaches will result in reflective layers that are distributed widely throughout all possible angular orientations on the surfaces of the microspheres.

An embedded reflective layer may exhibit any suitable thickness, measured at several locations over the extent of the reflective layer). It will be appreciated that different methods of making a reflective layer may give rise to reflective layers of differing thickness. In various embodiments, an embedded reflective layer may exhibit an average thickness (e.g. measured at several locations over the extent of the reflective layer) of from at least 0.01, 0.05, 0.1, 0.2, 0.5, 1, 2, 4, or 8 microns, to at most 40, 20, 10, 7, 5, 4, 3, 2 or 1 microns. In various other embodiments, an embedded reflective layer may comprise an average thickness of at least 10, 20, 40 or 80 nanometers; in further embodiments such a reflective layer may comprise an average thickness of at most 10, 5, 2 or 1 microns, or of at most 400, 200 or 100 nanometers. If the reflective layer (or set of sublayers, e.g. of a dielectric stack that collectively provides a reflective layer) is a layer of a multilayer stack (e.g. a transfer stack as described later herein), these thicknesses apply only to the reflective layer itself.

The arrangements disclosed herein provide a transparent microsphere with a reflective layer 30 that occupies a portion 28 of embedded area 25 that is smaller, sometimes far smaller, than the total embedded area 25 of the transparent microsphere 21. In at least some embodiments, this can provide significant advantages. For example, this can provide that acceptable retroreflective performance is achieved (e.g. at least with light that impinges on the microspheres generally along the front-rear axis of the article), while also providing that the presence of the reflective layers does not significantly detract from the appearance of the article in ambient light. That is, in ambient light the article may exhibit an appearance that is largely imparted by the composition of the binder, in particular by any colorants or patterns that may be present in the binder, rather than being dominated by the presence of reflective layers.

In further detail, for a retroreflective article in which the entirety of the embedded areas of all of the microspheres of the article are covered with reflective layers, the reflective layers can dominate the appearance of the article in ambient light (e.g. so that the article exhibits a grey or washed-out appearance). In contrast, the present arrangements can provide that the "native" color of the article, e.g. as imparted by one or more colorants disposed in the binder layer, can be perceived in ambient light. In other words, enhanced color fidelity or vividness in ambient light can be provided.

It will thus be appreciated that the arrangements disclosed herein allow designers of retroreflective articles to operate in a design space in which the retroreflective performance, and the color/appearance in ambient light, of the article can both be manipulated. While there may be some tradeoff (e.g. the retroreflectivity may rise as the color fidelity falls, and vice versa) the design space is such that acceptable values of both parameters can be obtained, and can be tailored for particular applications.

Nonuniform Reflective Layers

Figure 9A:
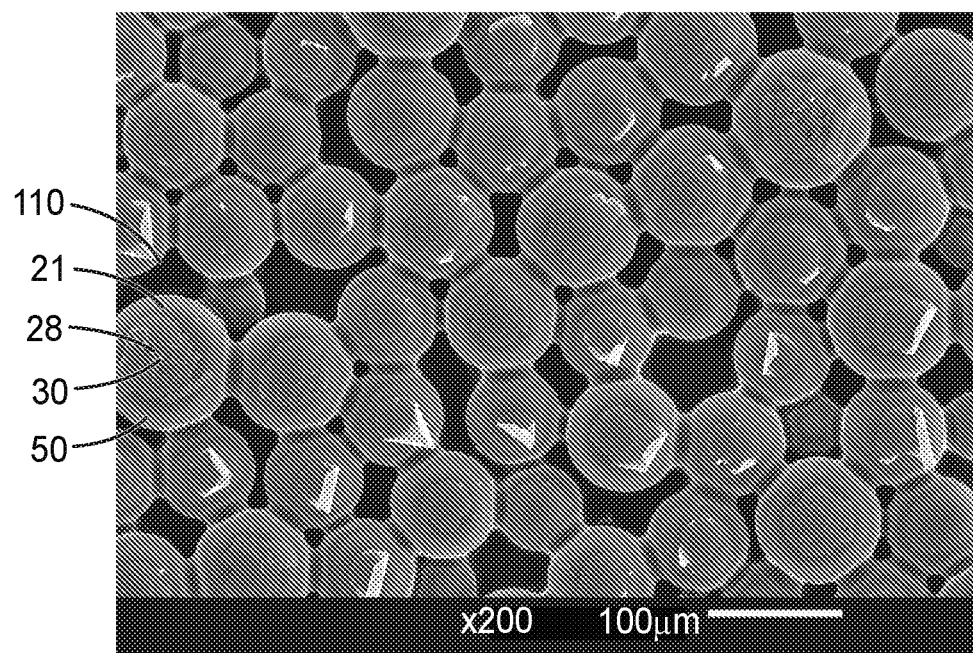
FIG. 9a is a scanning electron microscope secondary-electron 200× photograph of an exemplary Working Example article comprising a carrier layer bearing transparent microspheres with embedded, localized reflective layers disposed thereon.
Figure 9B:
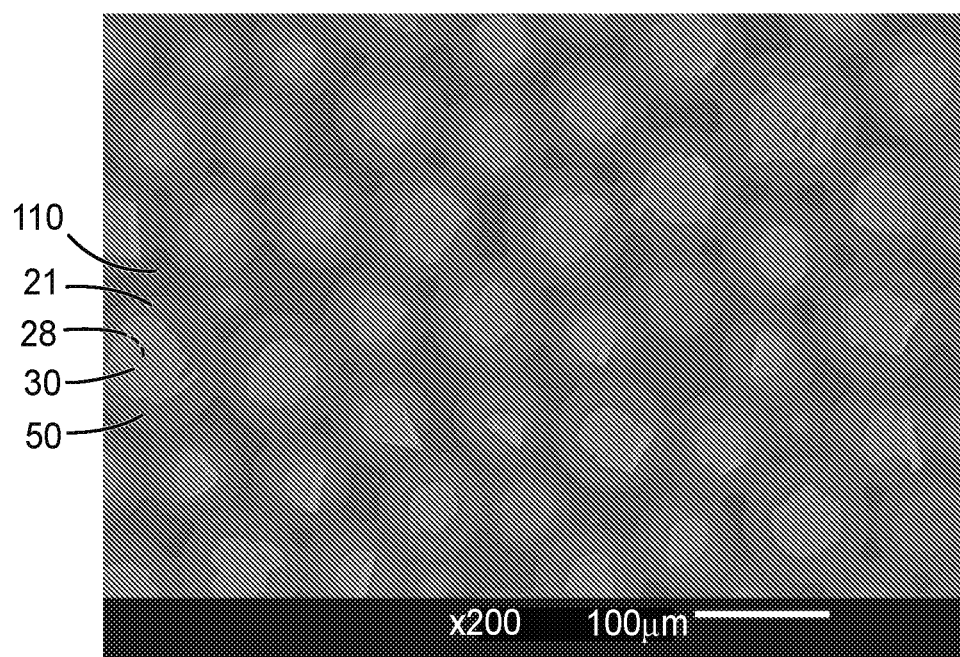

The present arrangements tolerate, and even make use of, significant variability in the reflective layers. That is, it will be appreciated from the discussions herein that at least some methods by which embedded reflective layers are formed can result in significant variability in the percent area coverage exhibited by the reflective layers (i.e., in the size of reflective-layer-covered area 28 in relation to embedded area 25) over the population of microspheres. This is evidenced by the variability in the sizes of areas 28 that are covered by reflective layers 30, in the scanning electron micrographs (at various magnifications) of various Working Example samples that are presented in FIGS. 9a/9b, 10a/10b, and 11a/11b. The "a" Figures are obtained via secondary electron imaging, which provides more visual detail. The "b" Figures are the same images but obtained via electron backscattering, in which high atomic number elements stands out as being very light (white) colored. (In the particular Working Example samples presented in these Figures the reflective layer was metallic silver which appeared very white in contrast to the darker colors of the glass microspheres and the various organic polymer layers in the "b" figures.)

All of these Figures (as well as FIG. 12) are of carrier-borne microspheres 21 with an intervening layer 50 (described later herein) and a reflective layer 30 disposed thereon but without a binder layer 10 having yet been formed thereon. However, these Figures are considered to be representative of how the microspheres and reflective layers would be arranged, after a binder layer had been formed thereon. The occasional dark-colored cavities visible in these Figures result from through-holes in the intervening layer 50 where the layer precursor did not fully wet into gaps between the microspheres 21, thus the surface of the carrier layer 110 is visible (and is dark-colored) through the resulting holes in the intervening layer.

Figure 10A:
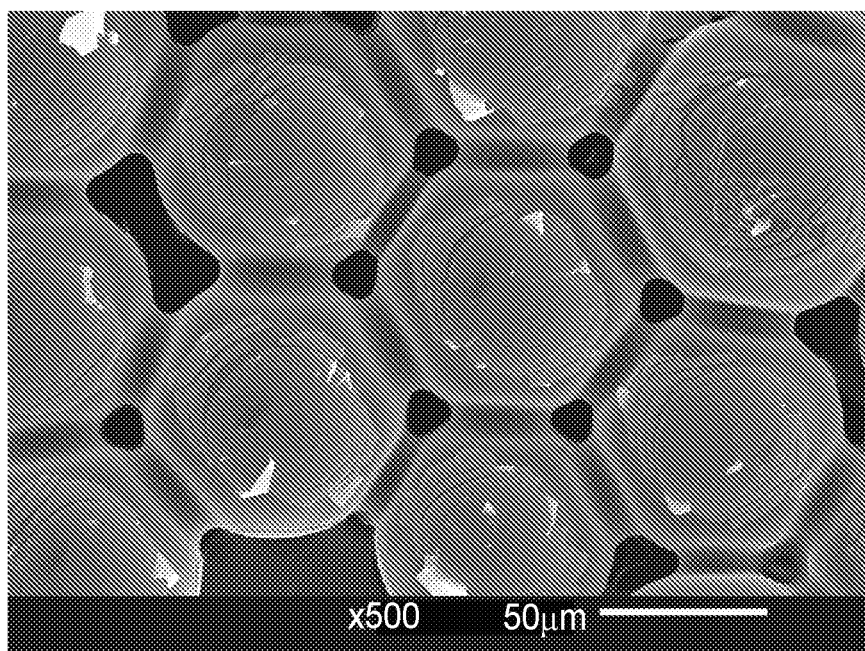
FIG. 10a is a scanning electron microscope secondary-electron 500× photograph of a portion of an exemplary Working Example article comprising a carrier layer bearing transparent microspheres with embedded, localized reflective layers disposed thereon.
Figure 10B:
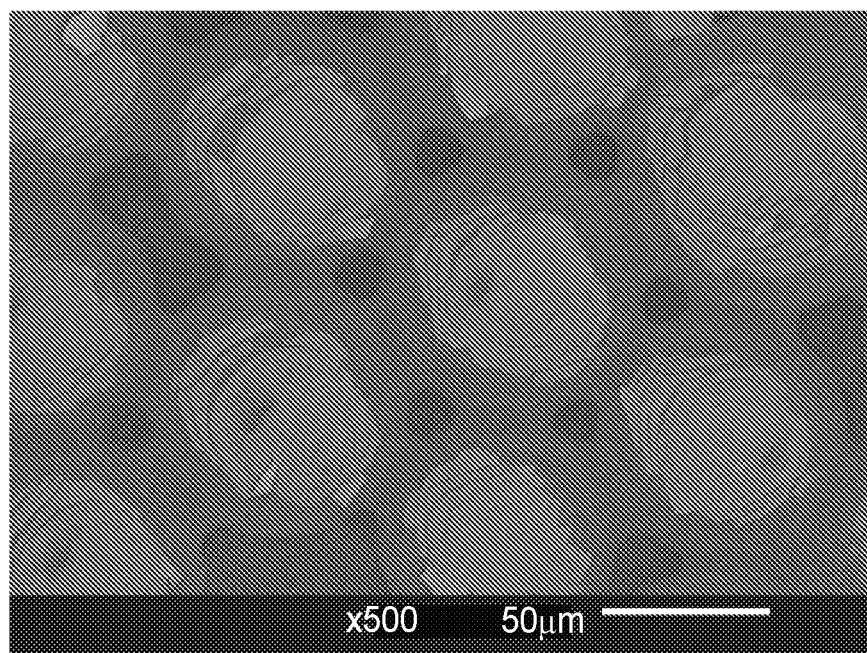
Figure 11A:
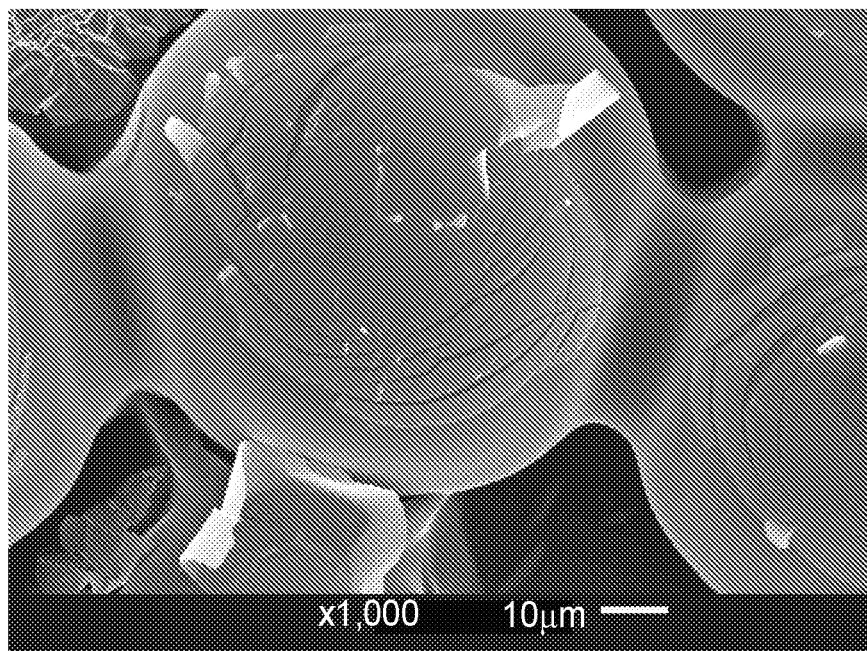
FIG. 11a is a scanning electron microscope secondary-electron 1000× photograph of a portion of an exemplary Working Example article comprising a carrier layer bearing transparent microspheres with embedded, localized reflective layers disposed thereon.
Figure 11B:
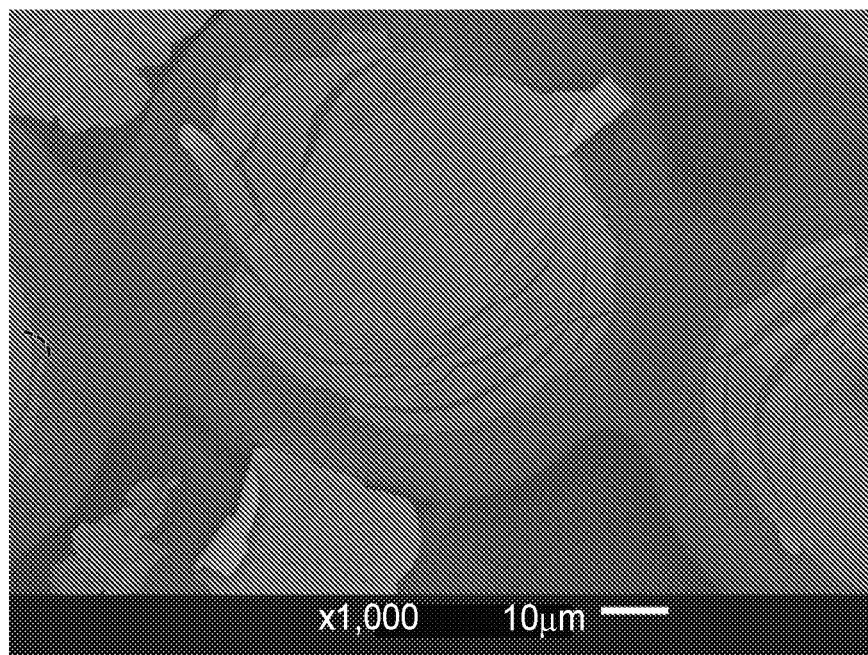

As noted above, FIGS. 9a/9b, 10a/10b, and 11a/11b (as well as FIG. 12) reveal considerable variation in the area coverage exhibited by the different reflective layers. The particular Working Example samples shown in these Figures were all obtained by physical-transfer (lamination) methods; however, other methods (e.g. printing, and deposition/etching) also imparted considerable variation in the area coverage exhibited by the reflective layers. Still further, as is evident from the higher-magnification micrographs of FIGS. 10a/10b and 11a/11b, in many instances transferred reflective layers exhibit numerous interruptions (e.g. cracks and gaps) within the nominal overall area covered by the reflective layer. The previously-discussed percent area coverage may be calculated in disregard of such gaps if they are relatively insignificant (e.g., if they will not change the calculated area coverage by more than 10%). However, if such gaps would significantly affect the calculated area coverage, they should be taken into account. The previously-discussed angular arc, however, may be calculated using the nominal outer perimeter of the reflective layer, disregarding any such gaps.

It will thus be appreciated that for a population of retroreflective elements, the percent area coverages (and resulting overall sizes) exhibited by the different reflective layers, and the amount and/or size of gaps within the different reflective layers, may vary considerably. (Based on the above discussions it will be appreciated that the non-photographic Figures of the present application are idealized representations in which, for ease of presentation, the above-discussed variations are not depicted.) Surprisingly, acceptable or even excellent retroreflective performance can be obtained in spite of such nonuniformity of the reflective layers. In various embodiments, the percent area coverage of embedded areas of transparent microspheres by reflective layers, when evaluated over a statistically appropriate sample of microspheres of the total microsphere population, may exhibit a coefficient of variation (obtained by standard statistical techniques, and expressed as a decimal proportion) that is greater than zero. By way of a specific example, a set of microspheres whose reflective layers exhibited a mean percent area coverage of 44 percent and a standard deviation of 26 percent (in the same units as the mean), would exhibit a coefficient of variation of 0.59.

Reflective layers with percent area coverages (of the embedded areas of the microspheres) that exhibit a coefficient of variation of greater than 0.05 will be referred to herein as "nonuniform" reflective layers. In various embodiments, nonuniform reflective layers may be configured so that the percent area coverage of embedded areas of transparent microspheres by the reflective layers exhibits a coefficient of variation of greater than 0.10, 0.15, 0.20, 0.30, 0.40, 0.50, 0.60, 0.80, 1.0, 1.2, 1.4, or 2.0. In similar manner, a coefficient of variation of the percent area coverage of the total surface area of the transparent microspheres by the reflective layers may be calculated. In various embodiments, such a coefficient of variation may be greater than 0.05, 0.10, 0.15, 0.20, 0.30, 0.40, 0.50, 0.60, 0.80, 1.0, 1.2, 1.4, or 2.0. In similar manner, a coefficient of variation of the previously-described angular arcs occupied by the reflective layers may be calculated. In various embodiments, such a coefficient of variation may be greater than 0.05, 0.10, 0.15, 0.20, 0.30, 0.40, 0.50, 0.60, 0.80, 1.0, 1.2, 1.4, or 2.0.

It will be appreciated that a population of nonuniform reflective layers as defined and described herein differs markedly from conventional, uniform populations of reflective layers as often described in the art. Conventional approaches (whether using transparent microspheres, prismatic elements such as cube-corners, etc.) typically seek to achieve as much uniformity in geometric parameters as possible. Ordinary artisans will appreciate that conventional procedures in which transparent microspheres are partially embedded in a temporary carrier, the protruding portions of the microspheres are provided with reflective layers by deposition methods that are at least generally uniform over a large scale, and a binder layer is then formed thereon, will not produce nonuniform reflective layers as defined and described herein. Examples of at least generally uniform deposition methods (i.e., methods that "blanket" a large number of protruding portions of microspheres with reflective coatings in generally uniform fashion) that would not be expected by an ordinary artisan to provide nonuniform reflective coatings include e.g. vacuum deposition, vapor coating, sputter coating, electroless plating, and the like (when performed without any masking, subsequent etching, or any such action that might impose variation). Specific examples of reflective layers that exhibit such high uniformity as to seemingly exhibit a zero coefficient of variation and that thus would not qualify as nonuniform reflective layers as defined herein, include e.g. the reflective layers pictured in U.S. Pat. Nos. 3,700,305, 4,763,985, and 5,344, 705.

It is thus evident that the approaches disclosed herein differ sharply from conventional approaches to producing retroreflective articles. The present arrangements tolerate, and even welcome, considerable variation in the shape, size, etc. of the various reflective layers, as long as acceptable overall performance (in particular, a balance between retroreflectivity in retroreflected light and color fidelity/vividness in ambient light) is achieved. Furthermore, rather than requiring reflective layers to be continuous and defect-free (i.e. free of through-holes), in at least some embodiments at least some of the reflective layers may comprise interruptions (e.g. holes, cracks or gaps) so that they are optically "leaky".

Absence of Reflective Layers

Still further, in some embodiments a significant number of transparent microspheres may completely lack an embedded reflective layer. (Microspheres without embedded reflective layers will not be included in the above-mentioned statistical analysis to obtain a coefficient of variation for the percent area coverage of the reflective layer population.) That is, some methods of reflective layer formation may leave a large number of microspheres without a reflective layer disposed thereon. Numerous transparent microspheres that lack any reflective layer are visible in the photograph of a Working Example sample presented in FIG. 12; one such microsphere is identified by the reference number 37 (the small white dots that are visible in the center of many such microspheres are optical artifacts of the microspheres themselves.) For comparison, a randomly picked reflective-layer-bearing microsphere is identified by reference number 20. The presence of transparent microspheres that lack reflective layers has been found to be acceptable (e.g., a sufficiently high coefficient of retroreflectivity can still be attained) in many circumstances.

Figure 12:
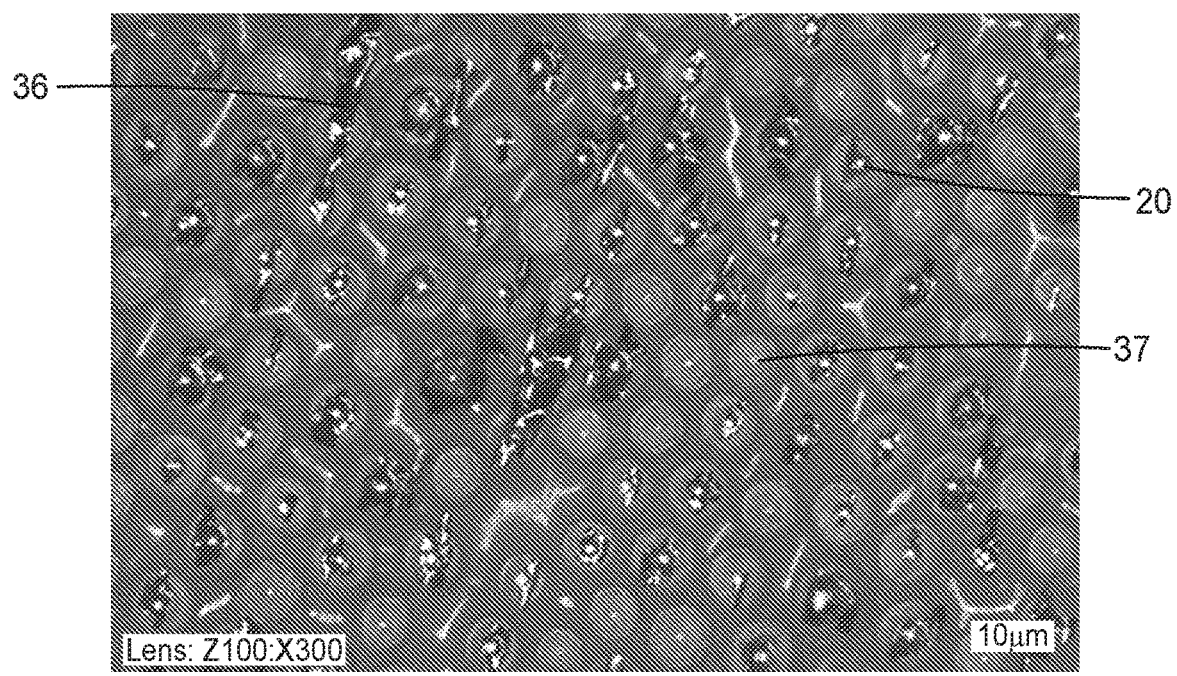
FIG. 12 is an optical microscope 300× photograph of a portion of an exemplary Working Example article comprising a carrier layer bearing transparent microspheres with embedded reflective layers disposed thereon.
Figure 13:
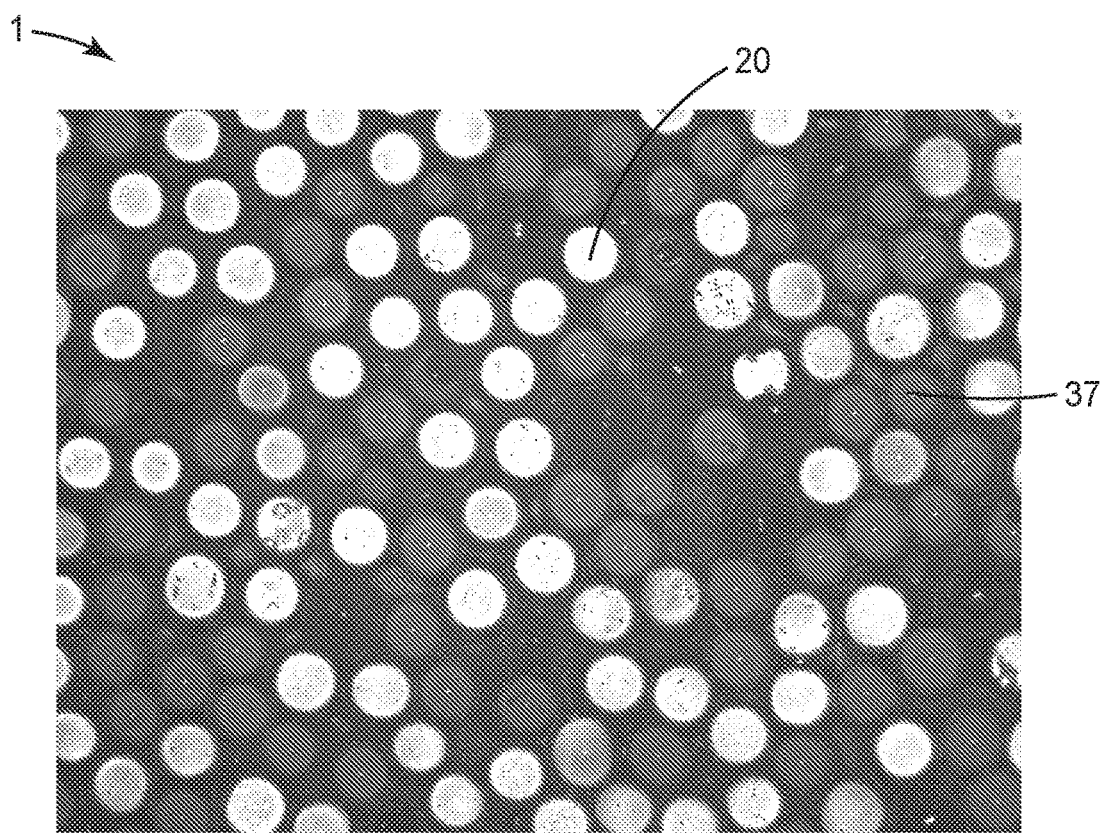
FIG. 13 is a front-lit optical microscope photograph of a portion of an exemplary Working Example retroreflective article.

FIG. 13 is a front-lit optical microphotograph (taken at a magnification similar to that of FIG. 12), of the front (viewing) side of a retroreflective article (including a binder layer) of a generally similar type to that shown in FIG. 12. While the FIG. 13 photograph is not quantitative, it reveals that under conditions of front-lit microscope interrogation (which mimics a retroreflective viewing condition with the light source fairly close to the detector), microspheres bearing reflective layers disposed thereon exhibit pronounced retroreflectivity and are clearly distinguishable from microspheres 37 without reflective layers disposed thereon. Furthermore, the reflective-layer-bearing microspheres 20 of FIG. 13 appear to display good uniformity of retroreflection even though they comprise reflective layers that vary widely in size and shape (i.e., that are of the general type of FIG. 12).

Thus in various embodiments, a retroreflective article may be configured so that the transparent microspheres that comprise embedded reflective layers represent less than 95, 90, 80, 60, 40, 20, or even 15 percent (by number) of the total transparent microspheres present in the retroreflective article. In other embodiments, transparent microspheres that comprise embedded reflective layers will be more than 5, 10, 20, 30, 50, 70, or 80 percent of the total transparent microspheres present in the retroreflective article. In many embodiments the transparent microspheres that lack embedded reflective layers will not comprise any reflective layer disposed thereon (the presence of a "secondary" reflective layer achieved by including reflective particles in binder layer 10, as discussed later herein, is excluded from the definition of a reflective layer that is "disposed on" a microsphere).

In some embodiments, an embedded reflective layer 30 may comprise a metal layer, e.g. a single layer, or multiple layers, of vapor-deposited metal (e.g. aluminum or silver). In some embodiments such a layer or layers (or precursor to form such a layer or layers) may be deposited directly onto areas 25 of transparent microspheres 21 (or onto rearward surface of 53 of an intervening layer 50, or a rearward surface 43 of a color layer 40, as discussed later herein). In some embodiments, portions of a previously-deposited (e.g. a continuous vapor-deposited) reflective layer may be removed (e.g. by etching) to transform the metal reflective layer into a localized, embedded reflective layer, as discussed in further detail later herein.

In some embodiments, an embedded reflective layer may comprise a dielectric reflective layer, comprised of an optical stack of high and low refractive index layers that combine to provide reflective properties. Dielectric reflective layers are described in further detail in U.S. Patent Application Publication No. 2017/0131444, which is incorporated by reference in its entirety herein for this purpose. In particular embodiments, a dielectric reflective layer may be a so-called layer-by-layer (LBL) structure in which each layer of the optical stack (i.e., each high-index layer and each low-index layer) is itself comprised of a substack of multiple bilayers. Each bilayer is in turn comprised of a first sub-layer (e.g. a positively charged sub-layer) and a second sub-layer (e.g. a negatively charged sub-layer). At least one sub-layer of the bilayers of the high-index substack will comprise ingredients that impart a high refractive index, while at least one sub-layer of the bilayers of the low-index substack will comprise ingredients that impart a low refractive index. LBL structures, methods of making such structures, and retroreflective articles comprising dielectric reflective layers comprising such structures, are described in detail in U.S. Patent Application Publication No. 2017/0276844, which is incorporated by reference in its entirety herein. In some embodiments a reflective layer thus may comprise multiple sublayers. In some embodiments a hybrid configuration may be used in which metal reflective layers and dielectric reflective layers may both be present, e.g. as discussed in U.S. Patent Application Publication 2017/0192142. In some embodiments a layer of a transfer stack (e.g. a selective-bonding layer 303 or an embrittlement layer 302 as described elsewhere herein) may serve as a layer of a dielectric stack.

In some embodiments, an embedded reflective layer may comprise a printed layer (e.g. comprising a reflective material such as metallic aluminum or silver). For example, a flowable precursor comprising one or more reflectivity-imparting materials (e.g., a silver ink) may be disposed (e.g. printed) on portions 28 of areas 25 of microspheres 21 (or on layers thereon) and then solidified into a reflective layer. If desired, a printed (or otherwise disposed) reflective layer may be heat treated (e.g. sintered) to enhance the optical properties of the reflective layer. In particular embodiments, a printed or coated reflective layer may further comprise particles, e.g. flakes, of reflective material (e.g. aluminum flake powder, pearlescent pigment, etc.). Various reflective materials which may be suitable are described in U.S. Pat. Nos. 5,344,705 and 9,671,533, which are incorporated by reference in their entirety herein.

In some embodiments, an embedded reflective layer may be a "locally-laminated" reflective layer. By a locally-laminated reflective layer is meant that a reflective layer is pre-made as an article (e.g. as part of a film-like or sheet-like structure) after which a local area of the pre-made reflective layer is physically transferred (i.e. laminated) to a portion of a carrier-borne transparent microsphere. In some embodiments a locally-laminated reflective layer will be derived from a multilayer "transfer stack" that includes one or more additional layers in addition to the reflective layer. The additional layer(s) can facilitate the transfer of the reflective layer to the transparent microsphere as discussed in detail later herein. In various embodiments, some such additional layers may remain as part of the resulting retroreflective article and some may be sacrificial layers that do not remain as part of the resulting retroreflective article.

Transfer stacks (referred to as transfer articles) are described in general terms in U.S. Provisional Patent Application 62/478,992, which is incorporated by reference in its entirety herein. Locally-laminated reflective layers of various constructions and configurations are described in detail in U.S. Provisional Patent Application No. 62/578,343 (e.g., in Example 2.3 (including Examples 2.3.1-2.3.3) and Example 2.4 (including Examples 2.4.1-2.4.5)), which is incorporated by reference in its entirety herein. Locally-laminated reflective layers, ways in which such layers can be produced, and ways in which such reflective layers can be identified and distinguished from other types of reflective layers, are also described in detail in U.S. Provisional Patent Application No. 62/739,506, entitled RETROREFLECTIVE ARTICLE COMPRISING LOCALLY-LAMINATED REFLECTIVE LAYERS, filed evendate herewith and incorporated by reference herein in its entirety. In general, any reflective layer 30, e.g. of any of the above-discussed types, can be disposed on a rearward surface of a portion 28 of an embedded area 25 of a transparent microsphere 21 or on a rearward surface of a layer present thereon (e.g., of an intervening layer 50 or a color layer 40 as described later herein).

Figure 5:
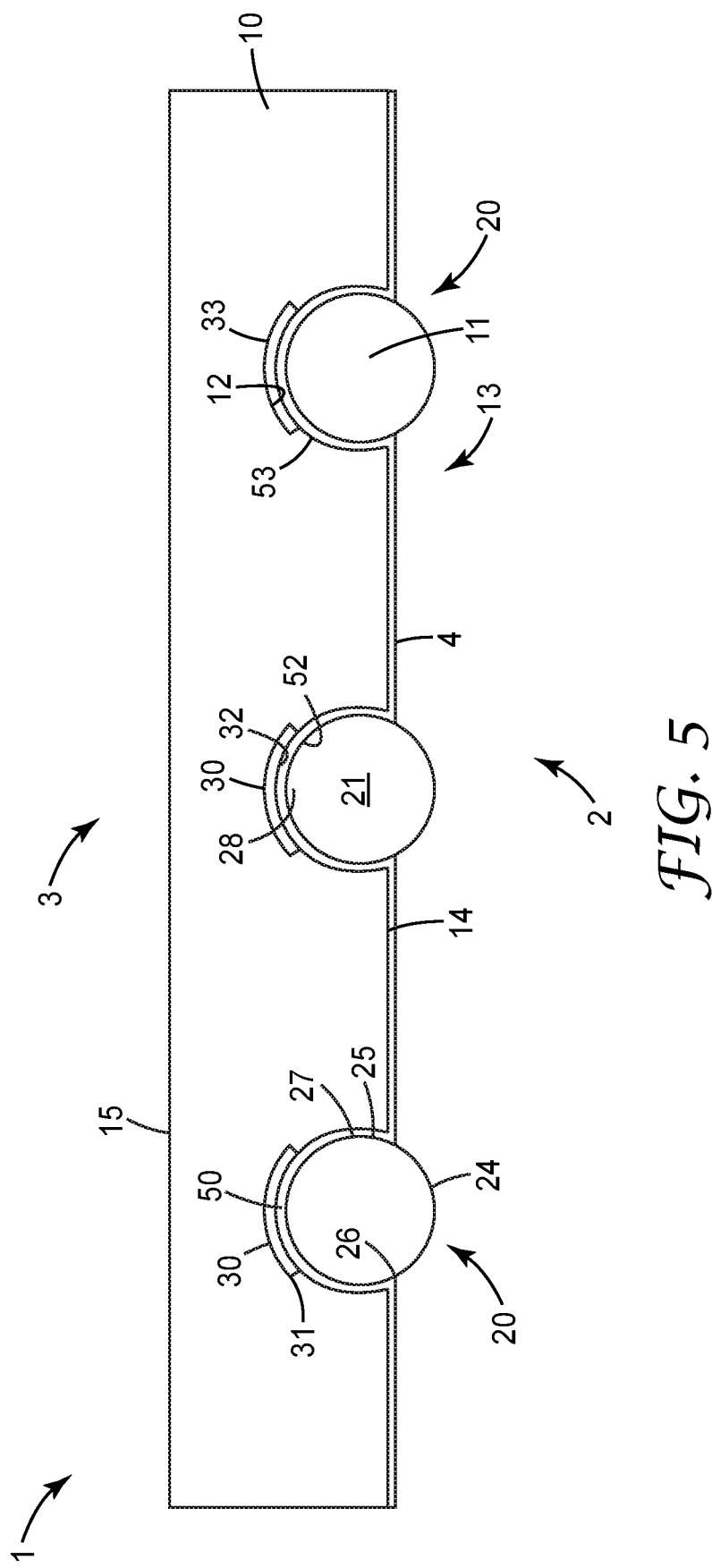
FIG. 5 is a side schematic cross sectional view of another exemplary retroreflective article.

As shown in exemplary embodiment in FIG. 5, in some embodiments an intervening layer 50 (e.g. a transparent layer of organic polymeric material) may be provided so that a portion, or the entirety, of the intervening layer is rearward of a microsphere 21 and forward of at least a portion of an embedded reflective layer 30. At least a portion of such an intervening layer 50 may thus be sandwiched between microsphere 21 and reflective layer 30, e.g. with a forward surface 52 of intervening layer 50 being in contact with a rearward surface of embedded area 25 of microsphere 21, and with a rearward surface 53 of intervening layer 50 being in contact with forward surface 32 of embedded reflective layer 30. In some embodiments such a layer 50 may be continuous so as to have portions that reside on front surface 4 of article 1 in addition to being present rearward of microspheres 21, as in the exemplary arrangement of FIG. 5. In other embodiments such a layer may be discontinuous (e.g., it may be a localized, embedded layer) and may only be present rearward of microspheres 21 e.g. in a similar manner to later-described color layers 40 of FIG. 6. Furthermore, even a "continuous" layer 50 may exhibit occasional through-holes or cavities in places where the layer precursor did not fully wet into gaps between the microspheres 21, as noted earlier.

Such an intervening layer may serve any desired function. In some embodiments it may serve as a physically-protective layer and/or a chemically-protective layer (e.g. that provides enhanced abrasion resistance, resistance to corrosion, etc.). In some embodiments such a layer may serve as a bonding layer (e.g. a tie layer or adhesion-promoting layer) that is capable of being bonded to by a reflective layer as discussed later herein. It will be appreciated that some intervening layers may serve more than one, e.g. all, of these purposes. In some embodiments, such an intervening layer may be transparent (specifically, it may be at least essentially free of any colorant or the like). Organic polymeric layers (e.g. protective layers) and potentially suitable compositions thereof are described in detail in U.S. Patent Application Publication No. 2017/0276844, which is incorporated by reference in its entirety herein. In particular embodiments, such a layer may be comprised of a polyurethane material. Various polyurethane materials that may be suitable for such purposes are described e.g. in U.S. Patent Application Publication No. 2017/0131444, which is incorporated by reference in its entirety herein.

Figure 6:
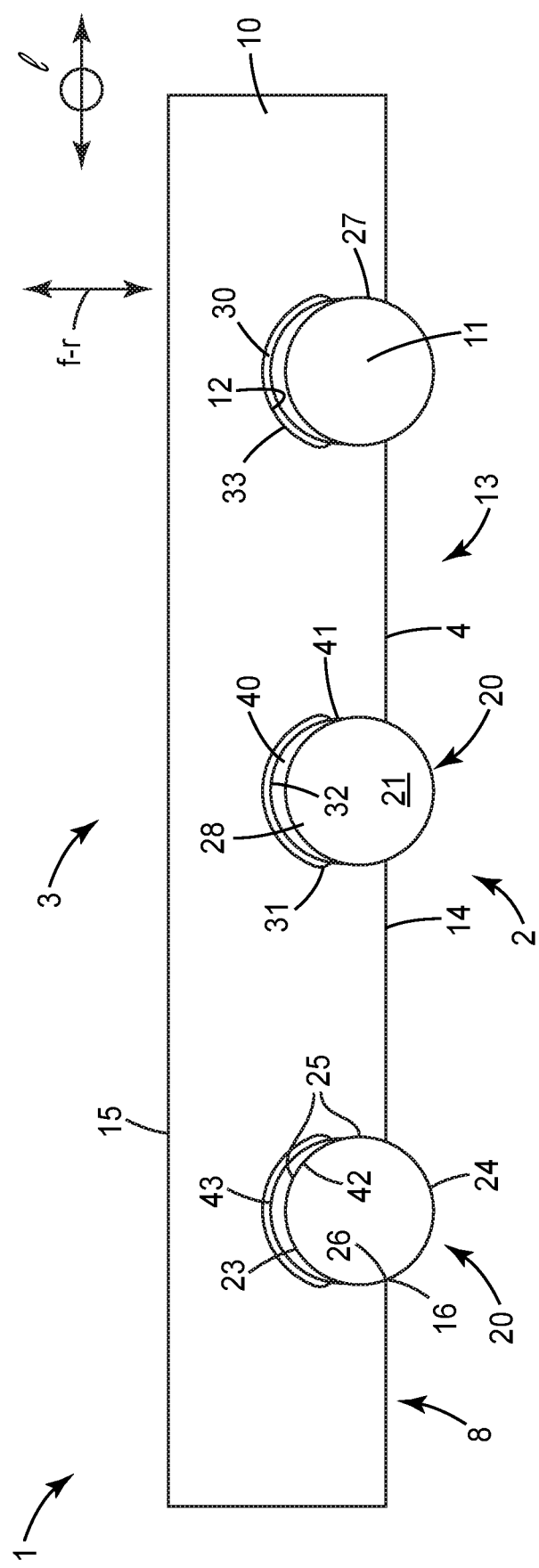
FIG. 6 is a side schematic cross sectional view of another exemplary retroreflective article.

As illustrated in exemplary embodiment in FIG. 6, in some embodiments at least some of the retroreflective elements 20 may comprise at least one color layer 40. The term "color layer" is used herein to signify a layer that preferentially allows passage of electromagnetic radiation in at least one wavelength range while preferentially minimizing passage of electromagnetic radiation in at least one other wavelength range by absorbing at least some of the radiation of that wavelength range. In some embodiments a color layer will selectively allow passage of visible light of one wavelength range while reducing or minimizing passage of visible light of another wavelength range. In some embodiments a color layer will selectively allow passage of visible light of at least one wavelength range while reducing or minimizing passage of light of near-infrared (700-1400 nm) wavelength range. In some embodiments a color layer will selectively allow passage of near-infrared radiation while reducing or minimizing passage of visible light of at least one wavelength range. A color layer as defined herein performs wavelength-selective absorption of electromagnetic radiation by the use of a colorant (e.g. a dye or pigment) that is disposed in the color layer. A color layer is thus distinguished from a reflective layer (and from a transparent layer), as will be well understood by ordinary artisans based on the discussions herein.

Any such color layer 40 can be arranged so that light that is retroreflected by a retroreflective element 20 passes through the color layer so that the retroreflected light exhibits a color imparted by the color layer. A color layer 40 can thus be disposed so that at least a portion of layer 40 is located between rearward surface 23 of embedded area 25 of transparent microsphere 21 and forward surface 32 of embedded reflective layer 30 so that at least this portion of the color layer 40 is in the retroreflective light path. Thus, a forward surface 42 of color layer 40 may be in contact with a rearward surface of embedded area 25 of microsphere 21; and, a rearward surface 43 of color layer 40 may be in contact with forward surface 32 of embedded reflective layer 30. In some embodiments an above-mentioned intervening layer (e.g. a transparent layer) 50 may be present in addition to a color layer 40; such layers may be provided in any order (e.g. with the color layer forward of, or rearward of, the intervening layer) as desired. In some embodiments, a color layer 40 may serve some other function (e.g. as an adherable layer or a tie layer) in addition to imparting color to the retroreflected light.

In some embodiments a color layer 40 may be a discontinuous color layer, e.g. a localized color layer as in the exemplary embodiment shown in FIG. 6. In particular embodiments a localized color layer 40 may be an embedded color layer (with the terms localized and embedded having the same meanings as used for reflective layers as discussed above). That is, an embedded color layer 40 may comprise minor edges 41 that are "buried" rather than being exposed edges. In various embodiments, a localized color layer may exhibit an average thickness (e.g. measured at several locations over the extent of the color layer) of from at least 0.1, 0.2, 0.5, 1, 2, 4, or 8 microns, to at most 40, 20, 10, 7, 5, 4, 3, 2 or 1 microns. In some embodiments an intervening layer 50 may be provided with colorant so that it serves as a color layer 40 (in addition to serving any or all of the above-listed functions).

The presence of color layers (e.g. localized, embedded color layers) in at least some of the retroreflective light paths of a retroreflective article can allow article 1 to comprise at least some areas that exhibit colored retroreflected light, irrespective of the color(s) that these areas (or any other areas of the article) exhibit in ambient (non-retroreflected) light. In some embodiments, an embedded reflective layer may be configured so that the entirety of the reflective layer is positioned rearwardly of a color layer. This can ensure that incoming light cannot reach the reflective layer (nor be reflected therefrom) without passing through the color layer, regardless of the angle at which the light enters and exits the transparent microsphere. Such arrangements can provide that light that is retroreflected from a retroreflective element exhibits a desired color, regardless of the entrance/exit angle of the light. Such arrangements can also enable the color layer to mask the reflective layer for advantageously enhanced color appearance in ambient (non-retroreflective) light. In other embodiments, an embedded reflective layer may be configured so that at least some portion of the reflective layer extends beyond a minor edge of the color layer so that light can be reflected from the reflective layer without passing through the color layer. Such arrangements can provide that retroreflected light can exhibit different colors depending on the entrance/exit angle of the light.

The previously mentioned parameters (e.g., the angular arc occupied by a layer, and the percentage of the embedded area of the microsphere that is covered by a layer) can be used for characterization of a localized, embedded color layer in relation to a transparent microsphere and in relation to an embedded reflective layer with which it shares a retroreflective light path. In various embodiments, at least some localized, embedded color layers 40 may be disposed so that they each occupy an angular arc comprising less than about 190, 170, 150, 130, 115, or 95 degrees. In further embodiments, at least some localized, embedded color layers may each occupy an angular arc of at least about 5, 15, 40, 60, 80, 90, or 100 degrees. In various embodiments, at least some embedded reflective layers may be disposed so that each occupies an angular arc that is less than that of a localized, embedded color layer with which it shares a retroreflective light path, by at least 5, 10, 15, 20, 25, or 30 degrees. In other embodiments, at least some embedded reflective layers may be disposed so that each occupies an angular arc that is greater than that of a localized, embedded color layer with which it shares a retroreflective light path, by at least 5, 10, 15, 20, 25 or 30 degrees.

Article 1 may be arranged to provide that the appearance of article 1 in ambient (non-retroreflected) light is controlled as desired. For example, in the exemplary arrangement of FIG. 1 the front surface 4 of article 1 is provided in part (e.g. in areas 8 of front side 2 of article 1 that are not occupied by transparent microspheres 21) by a visually exposed front surface 14 of binder layer 10. In such embodiments the appearance of front side 2 of article 1 in ambient light may thus be largely dominated by the color (or lack thereof) of binder layer 10 in areas 13 of binder layer 10 that are laterally between microspheres 21. Thus in some embodiments binder layer 10 may be a colorant-loaded (e.g. pigment-loaded) binder layer. The pigment may be chosen to impart any suitable color in ambient light, e.g. fluorescent yellow, green, orange, white, black, and so on.

In some embodiments the appearance of retroreflective article 1 in ambient light may be manipulated e.g. by the presence and arrangement of one or more color layers on a front side of article 1. In some embodiments any such color layers, e.g. in combination with a colorant-loaded binder, may be configured so that the front side of article 1 exhibits a desired image (which term broadly encompasses e.g. informational indicia, signage, aesthetic designs, and so on) when viewed in ambient light. In some embodiments, article 1 may be configured (whether through manipulation of the embedded reflective layers and/or manipulation of any color layers in the retroreflective light path) to exhibit images when viewed in retroreflected light. In other words, any arrangement by which the appearance of article 1 in ambient light may be manipulated (e.g. by the use of a colorant-loaded binder, the use of colorant-loaded layers on the front side 4 of article 1, etc.) may be used in combination with any arrangement by which the appearance of article 1 in retroreflected light may be manipulated (e.g. by the use of color layers, e.g. localized, embedded color layers, in the retroreflective light path).

Such arrangements are not limited to the specific exemplary combinations discussed herein and/or shown in the Figures herein. Many such arrangements are discussed in detail in U.S. Provisional Patent Application No. 62/675,020 which is incorporated by reference herein in its entirety; it will be understood that any of the color arrangements discussed in the '020 application can be used with the embedded reflective layers disclosed herein.

Regardless of the particular color arrangement that may be used, it will be clear based on the discussions herein that the use of embedded reflective layers 30, particularly those that occupy covered areas 28 that are relatively small percentages (e.g. less than 60%) of embedded areas 25 of transparent microspheres 21, can allow significantly enhanced color fidelity of a retroreflective article 1 (e.g., a reflective article comprising a colorant-loaded binder layer 10) when viewed in ambient light. In other words, in ambient light the article may exhibit a color that more closely matches the native color of the colorant-loaded binder (that is, the article may exhibit a color that is similar to that which would be exhibited by the article if the article did not comprise any retroreflective elements).

Transfer Article

In some embodiments, a retroreflective article 1 as disclosed herein may be provided as part of a transfer article 100 that comprises retroreflective article 1 along with a removable (disposable) carrier layer 110 that comprises front and rear major surfaces 111 and 112. In some convenient embodiments, retroreflective article 1 may be built on such a carrier layer 110, which may be removed for eventual use of article 1 as described later herein. For example, a front side 2 of article 1 may be in releasable contact with a rear surface 112 of a carrier layer 110, as shown in exemplary embodiment in FIG. 7.

Figure 7:
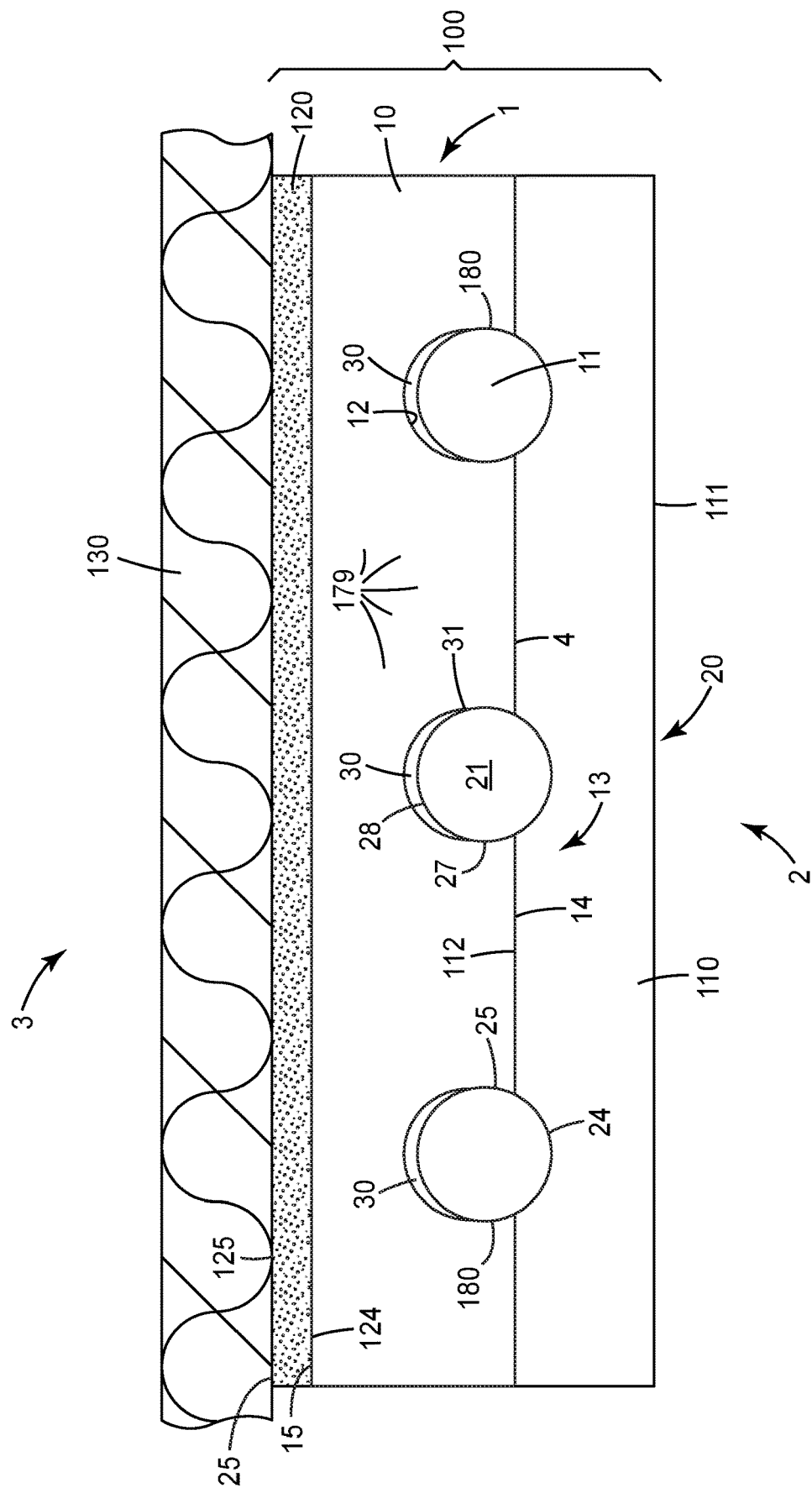
FIG. 7 is a side schematic cross sectional view of an exemplary transfer article comprising an exemplary retroreflective article, with the transfer article shown coupled to a substrate.

Retroreflective article 1 (e.g. while still a part of a transfer article 100) may be coupled to any desired substrate 130, as shown in FIG. 7. This may be done in any suitable manner. In some embodiments this may be done by the use of a bonding layer 120 that couples article 1 to substrate 130 with the rear side 3 of article 1 facing substrate 130. Such a bonding layer 120 can bond binder layer 10 (or any layer rearwardly disposed thereon) of article 1 to substrate 130, e.g. with one major surface 124 of bonding layer 120 being bonded to rear surface 15 of binder layer 10, and with the other, opposing major surface 125 of bonding layer 120 bonded to substrate 130. Such a bonding layer 120 may be e.g. a pressure-sensitive adhesive (of any suitable type and composition) or a heat-activated adhesive (e.g. an "iron-on" bonding layer). Various pressure-sensitive adhesives are described in detail in U.S. Patent Application Publication No. 2017/0276844, which is incorporated by reference in its entirety herein.

The term "substrate" is used broadly and encompasses any item, portion of an item, or collection of items, to which it is desired to e.g. couple or mount a retroreflective article 1. Furthermore, the concept of a retroreflective article that is coupled to or mounted on a substrate is not limited to a configuration in which the retroreflective article is e.g. attached to a major surface of the substrate. Rather, in some embodiments a retroreflective article may be e.g. a strip, filament, or any suitable high-aspect ratio article that is e.g. threaded, woven, sewn or otherwise inserted into and/or through a substrate so that at least some portions of the retroreflective article are visible. In fact, such a retroreflective article (e.g. in the form of a yarn) may be assembled (e.g. woven) with other, e.g. non-retroreflective articles (e.g. non-retroreflective yarns) to form a substrate in which at least some portions of the retroreflective article are visible. The concept of a retroreflective article that is coupled to a substrate thus encompasses cases in which the article effectively becomes a part of the substrate.

In some embodiments, substrate 130 may be a portion of a garment. The term "garment" is used broadly, and generally encompasses any item or portion thereof that is intended to be worn, carried, or otherwise present on or near the body of a user. In such embodiments article 1 may be coupled directly to a garment e.g. by a bonding layer 120 (or by sewing, or any other suitable method). In other embodiments substrate 130 may itself be a support layer to which article 1 is coupled e.g. by bonding or sewing and that adds mechanical integrity and stability to the article. The entire assembly, including the support layer, can then be coupled to any suitable item (e.g. a garment) as desired. Often, it may be convenient for carrier 110 to remain in place during the coupling of article 1 to a desired entity and to then be removed after the coupling is complete. Strictly speaking, while carrier 110 remains in place on the front side of article 1, the areas 24 of transparent microspheres 21 will not yet be air-exposed and thus the retroreflective elements 20 may not yet exhibit the desired level of retroreflectivity. However, an article 1 that is detachably disposed on a carrier 110 that is to be removed for actual use of article 1 as a retroreflector, will still be considered to be a retroreflective article as characterized herein.

Methods of Making

In some convenient embodiments, a retroreflective article 1 can be made by starting with a disposable carrier layer 110. Transparent microspheres 21 can be partially (and releasably) embedded into carrier layer 110 to form a substantially mono-layer of microspheres. For such purposes, in some embodiments carrier layer 110 may conveniently comprise e.g. a heat-softenable polymeric material that can be heated and the microspheres deposited thereonto in such manner that they partially embed therein. The carrier layer can then be cooled so as to releasably retain the microspheres in that condition for further processing.

Typically, the microspheres as deposited are at least slightly laterally spaced apart from each other although occasional microspheres may be in lateral contact with each other. The pattern (that is, the packing density or proportional area coverage) of microspheres as deposited on the carrier will dictate their pattern in the final article. In various embodiments, the microspheres may be present on the final article at a packing density of at least 30, 40, 50, 60 or 70 percent (whether over the entire article, or in microsphere-containing macroscopic areas of the article). In further embodiments, the microspheres may exhibit a packing density of at most 80, 75, 65, 55 or 45 percent (noting that the theoretical maximum packing density of monodisperse spheres on a plane is in the range of approximately 90 percent). In some embodiments the microspheres may be provided in a predetermined pattern, e.g. by using the methods described in U.S. Patent Application Publication 2017/0293056, which is incorporated by reference herein in its entirety.

In various embodiments the microspheres 21 may be partially embedded in carrier 110 e.g. to about 20 to 50 percent of the microspheres' diameter. The areas 25 of microspheres 21 that are not embedded in the carrier protrude outward from the carrier so that they can subsequently receive reflective layer 30 and binder layer 10 (and any other layers as desired). These areas 25 (which will form the embedded areas 25 of the microspheres in the final article) will be referred to herein as protruding areas of the microspheres during the time that the microspheres are disposed on the carrier layer in the absence of a binder layer. In customary manufacturing processes, there may be some variation in how deeply the different microspheres are embedded into carrier 110, which may affect the size and/or shape of the reflective layers that are deposited onto portions of the protruding surfaces of the different microspheres.

An exemplary carrier layer comprising transparent microspheres thereon is described in the Working Examples herein as a Temporary Bead Carrier. Further details of suitable carrier layers, methods of temporarily embedding transparent microspheres in carrier layers, and methods of using such layers to produce retroreflective articles, are disclosed in U.S. Patent Application Publication No. 2017/0276844.

After microspheres 21 are partially embedded in carrier 110, reflective layers (that will become embedded reflective layers after formation of binder layer 10) can be formed on portions of protruding areas 25 of at least some of the microspheres (again, protruding areas 25 will become embedded areas after binder layer 10 is formed). A reflective layer may be achieved by any method that can form a reflective layer (or a reflective layer precursor that can solidify e.g. by drying, curing, or the like to form the actual reflective layer) in such manner that the reflective layer is embedded as defined and described herein.

In many convenient embodiments a deposition process may be arranged to provide that a reflective layer is formed only on portions of protruding areas 25 of microspheres 21 and not, for example, on the surface 112 of the carrier 110. For example, a contact-transfer process (e.g. flexographic printing, or lamination) may be used in which a reflective layer (or precursor) is brought into contact with protruding areas of the microspheres so that the reflective layer transfers to portions of the protruding areas of the microspheres without transferring to the surface of the carrier to any significant extent. Any such process may be controlled so that the reflective layer (or precursor) is not disposed on the entirety of the protruding area 25 of a microsphere 21. That is, in some instances the process may be carried out so that a reflective layer or precursor is transferred only to an outermost portion of the protruding area 25 of microsphere 21 (which outermost portion will become the rearmost portion of embedded area 25 of microsphere 21 in the final article). In some instances a reflective layer may be transferred to a portion of the embedded area that is greater than the portion to be occupied by the reflective layer in the final article, after which some part of the reflective layer may be removed to leave only the desired area coverage.

By way of a specific example with reference to FIG. 3, a microsphere 21 may be disposed on a carrier 110 so that approximately 40% of the microsphere diameter is embedded in the carrier. Thus, an area 25 of microsphere 21 will protrude outward from a major surface of the carrier layer 110, to a maximum distance that corresponds to approximately 60% of the diameter of the microsphere. A reflective layer formation (e.g. transfer) process may be performed so that the reflective layer only covers outermost portion 28 (e.g. occupying an angular arc of approximately 80-85 degrees) of protruding area 25 of the microsphere. After the reflective layer formation process is complete, a remaining portion 27 of protruding area 25 of microsphere 21 will not comprise a reflective layer 30 thereon. Upon formation of a binder layer 10, a retroreflective element 20 will be formed comprising a microsphere 21 and reflective layer 30 arranged in the general manner depicted in FIG. 3. That is, reflective layer 30 will cover only a generally rearward portion 28 of embedded area 25 of microsphere 21, and will not cover the remaining (e.g. forward) portion 27 of embedded area 25.

Reflective layers 30 may be disposed on portions of protruding areas 25 of (carrier-borne) transparent microspheres 21 by any suitable method or combinations of methods. This may be done e.g. by vapor deposition e.g. of a metal layer such as aluminum or silver, by deposition of numerous high and low refractive index layers to form a dielectric reflective layer, by printing (e.g. flexographic printing) or otherwise disposing a precursor comprising a reflective additive and then solidifying the precursor, by physically transferring (e.g. laminating) a pre-made reflective layer, and so on. In particular embodiments, a printable ink may comprise a precursor additive that can be transformed into a reflective material. For example, an ink might comprise silver in a form (e.g. such as silver cations or as an organometallic silver compound) that, after being printed onto desired areas, can be chemically reacted (e.g. reduced) to form metallic silver that is reflective. Commercially available printable silver inks include e.g. PFI-722 Conductive Flexo Ink (Novacentrix, Austin, Tex.) and TEC-PR-010 ink (Inktec, Gyeonggi-do, Korea).

Thus in some embodiments, reflective layers 30 may be provided by printing a reflective ink or ink precursor on portions of protruding areas of carrier-borne transparent microspheres. Processes of this general type, in which a flowable precursor is deposited only onto certain portions of protruding areas of microspheres, will be characterized herein as "printing" processes. This will be contrasted with a "coating" process in which a material is deposited not only on protruding areas of the microspheres but also on the surface of the carrier, between the microspheres. In some convenient embodiments, such printing may comprise flexographic printing. Other methods of printing may be used as an alternative to flexographic printing. Such methods may include e.g. pad printing, soft lithography, gravure printing, offset printing, and the like. In general, any deposition method (e.g. inkjet printing) may be used, as long as the process conditions and the flow properties of the reflective layer precursor are controlled so that the resulting reflective layer is an embedded (e.g. localized) reflective layer. It will be appreciated that whatever the method used, it may be advantageous to control the method so that the precursor is deposited in a very thin layer (e.g. a few microns or less) and at an appropriate viscosity, to provide that the precursor remains at least substantially in the area in which it was deposited. Such arrangements may ensure that, for example, the resulting reflective layer occupies a desired portion 28 of embedded area 25 in the manner described above. It will also be appreciated that some deposition methods may provide a reflective layer in which the thickness may vary somewhat from place to place. In other words, the rearward major surface 33 of a reflective layer 30 may not necessarily be exactly congruent with the major forward surface 32 of the reflective layer. However, at least some amount of variation of this type (as may occur e.g. with flexographic printing) has been found to be acceptable in the present work.

In some embodiments, a localized, embedded reflective layer 30 may be provided e.g. by forming a reflective layer (e.g. by vapor coating of a metal, or by printing or coating a reflective ink) onto a carrier and microspheres thereon, and then removing (e.g. by etching) the reflective layer selectively from the surface of the carrier and from portions 27 of protruding areas 25 of the microspheres (before any binder layer is been formed) to leave localized reflective layers in place on the microspheres. In some particular embodiments of this type, an etch-resistant material (often referred to as a "resist") may be applied (e.g. by printing) on portions of a reflective layer that are atop the protruding areas of the microspheres, but is not applied to other portions of the microsphere-residing reflective layer and is not applied to the reflective layer that resides on the carrier surface. An etchant can then be applied that removes the reflective layer except the portions thereof that are protected by the resist. Such methods are described in further detail in U.S. Provisional Patent Application No. 62/578,343, which is incorporated by reference herein.

In some embodiments a localized, embedded reflective layer 30 may be provided by a local lamination process. A local lamination process is one in which a local area of a pre-made reflective layer is transferred to portion of a protruding area of a transparent microsphere. During this process, the local area of the reflective layer is detached from (breaks free of) a region of the reflective layer that previously (in the pre-made reflective layer before lamination) laterally surrounded the transferred area. The laterally-surrounding region of the reflective layer from which the local area was detached is not transferred to the microsphere (or to any portion of the resulting article) but rather is removed from the vicinity of the microsphere (e.g., along with other, sacrificial layers of a multilayer transfer stack of which the pre-made reflective layer was a part). Local lamination methods are described in detail in the aforementioned U.S. Provisional Patent Application No. 62/739,506, entitled RETROREFLECTIVE ARTICLE COMPRISING LOCALLY-LAMINATED REFLECTIVE LAYERS, filed evendate herewith and incorporated by reference herein in its entirety. Several of the Working Examples (e.g. Examples 2.3 and 2.4) in the present application also illustrate the use of local lamination methods.

In some embodiments, a carrier layer bearing transparent microspheres and any desired layers may be provided as an intermediate article, in the absence of any binder layer, as discussed in detail below. In other embodiments, after formation of the reflective layers (and deposition of any intervening layer 50 and/or color layer 40) is carried out, a binder precursor (e.g., a mixture or solution of binder layer components) can be applied to microsphere-bearing carrier layer 110. The binder precursor may be disposed, e.g. by coating, onto the microsphere-loaded carrier layer and then hardened to form a binder layer, e.g. a continuous binder layer. The binder may be of any suitable composition, e.g. it may be formed from a binder precursor that comprises an elastomeric polyurethane composition along with any desired additives, etc. Binder compositions, methods making binders from precursors, etc., are described in U.S. Patent Application Publication Nos. 2017/0131444 and 2017/0276844, which are incorporated by reference in their entirety herein.

In general, binder layer 10 is configured to support transparent microspheres 21 and is typically a continuous, fluid-impermeable, sheet-like layer. In various embodiments, binder layer 10 may exhibit an average thickness of from 1 to 250 micrometers. In further embodiments, binder layer 10 may exhibit an average thickness of from 30 to 150 micrometers. Binder layer 10 may include polymers that contain units such as urethane, ester, ether, urea, epoxy, carbonate, acrylate, acrylic, olefin, vinyl chloride, amide, alkyd, or combinations thereof. A variety of organic polymer-forming reagents can be used to make the polymer. Polyols and isocyanates can be reacted to form polyurethanes; diamines and isocyanates can be reacted to form polyureas; epoxides can be reacted with diamines or diols to form epoxy resins, acrylate monomers or oligomers can be polymerized to form polyacrylates; and diacids can be reacted with diols or diamines to form polyesters or polyamides. Examples of materials that may be used in forming binder layer 10 include for example: Vitel™ 3550 available from Bostik Inc., Middleton, Mass.; Ebecryl™ 230 available from UBC Radcure, Smyrna, Ga.; Jeffamine™ T-5000, available from Huntsman Corporation, Houston, Tex.; CAPA 720, available from Solvay Interlox Inc., Houston Tex.; and Acclaim™ 8200, available from Lyondell Chemical Company, Houston, Tex.

In some embodiments binder layer 10 may be at least generally visibly transmissive (e.g. transparent). In many convenient embodiments binder layer 10 may comprise one or more colorants. In particular embodiments a binder may comprise one or more fluorescent pigments. Suitable colorants (e.g. pigments) may be chosen e.g. from those listed in the above-cited '444 and '844 Publications.

In some embodiments, binder layer 10 may contain reflective particles 179, e.g. flakes, of reflective material (e.g. nacreous or pearlescent material), so that at least a portion of binder layer 10 that is adjacent to transparent microsphere 21 can function as a secondary reflective layer 180 as depicted in exemplary embodiment in FIG. 7. By a "secondary" reflective layer is meant a layer of binder layer 10 that serves to enhance the performance of a retroreflective element above the performance provided by the embedded "primary" reflective layer 30 that covers an area 28 of a transparent microsphere. A secondary reflective layer 180 by definition operates adjacent a portion 27 of embedded area 25 of the transparent microsphere 21 that is not covered by the embedded reflective layer 30. Such a secondary reflective layer (which may not necessarily have a well-defined rearward boundary) may provide at least some retroreflection due to the aggregate effects of the reflective particles that are present in the layer. It will be appreciated that such a secondary reflective layer may not necessarily provide the same amount and/or quality of retroreflection that is provided by an embedded reflective layer 30. However, such a secondary reflective layer may provide that, for example, areas 27 of transparent microspheres, that are not covered by embedded reflective layers 30, may nevertheless exhibit some retroreflectivity. Thus, in some embodiments, the embedded reflective layers 30 may act as primary reflectors that provide retroreflection e.g. at light-incidence angles that are generally aligned with the front-rear axis of the article, while the secondary reflective layers 180 may provide at least some secondary retroreflection e.g. at high or glancing angles of incident light. Furthermore, this may be done while still preserving at least a significant portion of the previously-described enhanced color fidelity that is enabled by the absence of any embedded reflective layers 30 in portions 27 of embedded areas 25 of microspheres 21.

To achieve such effects, in various embodiments binder layer 10 may be loaded with reflective particles 179 at a loading of at least 0.05, 0.10, 0.20, 0.50, 1.0, 2.0, or 5.0 weight percent. In further embodiments, binder layer may be loaded with reflective particles at a loading of at most 30, 20, 10, 6, 4, 2.0, 1.5, 0.8, 0.4, 0.3, or 0.15 weight percent. (All such loadings are on a dry-solids basis rather than including any liquid or volatile material that does not remain in the binder layer.) In various embodiments, the reflective particles may comprise an average particle size (diameter or effective diameter) of at least 5 microns; in further embodiments the reflective particles may comprise an average particle size of at most about 200 microns. It is noted that in many embodiments the reflective particles may be e.g. flake-like, with a high aspect ratio of e.g. greater than 2.0, 4.0, or 8.0. In such cases, the reflective particles may comprise, on average, a longest dimension of from at least 5 microns to at most 200 microns.

In some embodiments it may be particularly advantageous that the average particle size (or the average longest dimension, in the case of high aspect ratio particles) of the reflective particles in the binder be chosen to be smaller than the average particle size (diameter) of the transparent microspheres. Thus in various embodiments the average particle size of the reflective particles in the binder may be no more than 40%, 20%, 10%, or 5%, of the average particle size of the transparent microspheres.

Suitable reflective particles may be chosen from e.g. nacreous pigment flakes such as BiOCl, $TiO_2$-coated mica, oxide-coated glass flakes, hexagonal $PbCO_3$ particles, oxide-coated fluorphlogopite platelets and crystalline guanine platelets (obtained e.g. from fish scales). In various particular embodiments, secondary reflective layers 180 resulting from the presence of reflective particles 179 in binder layer 10, may be used in combination with embedded reflective layers 30 that exhibit an area coverage (i.e., that comprise a covered portion 28 of an embedded area 25) of less than 50, 40, 30, 20 or even 10 percent). In various embodiments, such secondary reflective layers may be used in combination with embedded reflective layers that exhibit an angular arc of less than 80, 60, 50, 40, 30, 20 or 10 degrees. In some embodiments, binder layer 10 will comprise less than 8.0, 7.5, 7.0, 6.0, 5.0, 4.0, 2.0, 1.5, 0.8, 0.4, 0.3, or 0.15 weight percent (total dry solids basis) nacreous reflective particles of any type (e.g. BiOCl, $PbCO_3$, guanine, etc.). Arrangements comprising primary and secondary reflective layers are discussed in further detail in U.S. Provisional Patent Application 62/739,529; entitled "RETROREFLECTIVE ARTICLE COMPRISING RETROREFLECTIVE ELEMENTS COMPRISING PRIMARY REFLECTIVE LAYERS AND SECONDARY REFLECTIVE LAYERS", filed evendate herewith and incorporated by reference herein in its entirety.

In some embodiments, any other layer may be provided rearwardly behind binder layer 10 (e.g. between binder layer 10 and a bonding (e.g. pressure-sensitive adhesive) layer 120, or between reflective layer 30 and binder layer 10, for any purpose. Thus in some embodiments e.g. in which binder layer 10 is at least partially visibly transmissive, a layer may be provided that includes an image that is visible, through binder layer 10, in ambient light. In a variation of such an approach, an image may be printed on the rearward surface 124 of binder layer 10. In some embodiments, a layer bearing a visible image can be printed behind reflective layer 30 prior to the application of binder layer 10.

Intermediate Article

Figure 8:
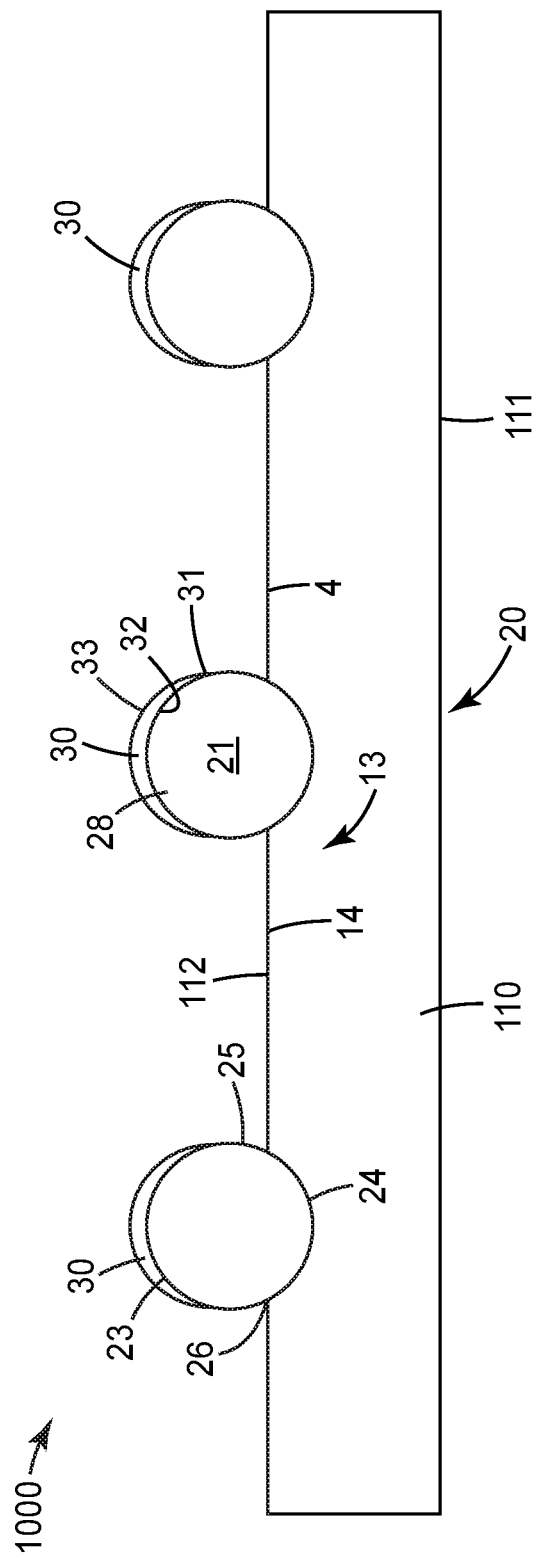
FIG. 8 is a side schematic cross sectional view of an exemplary retroreflective intermediate article, comprising a carrier layer bearing transparent microspheres with exemplary isolated reflective layers disposed thereon.

Discussions herein have primarily concerned articles of the general types shown e.g. in FIGS. 1 and 5 (including a binder layer, and in the form of e.g. a transfer article). However, in some embodiments the arrangements disclosed herein, comprising embedded reflective layers 30 or their equivalents, may be provided in an article that does not comprise a binder layer. Such an article will be termed an "intermediate" article for convenience of description. As shown in exemplary embodiment in FIG. 8, in embodiments of this type, an intermediate article 1000 may take the form of a carrier layer 110 bearing transparent microspheres 21 on a first surface 112 thereof, without any binder layer being present. (However, transparent microspheres 21 may be protected e.g. by a removable cover film provided on the microsphere-bearing side of the carrier layer, if desired.) Such an intermediate article will comprise at least some transparent microspheres 21 that comprise protruding areas 25 on portions 28 of which are disposed reflective layers 30. Strictly speaking these reflective layers 30 will not be "embedded" layers until a binder layer 10 is present. So, in embodiments of this particular type, such reflective layers will be equivalently characterized as being "isolated" reflective layers, meaning that they cover a portion, but do not cover the entirety, of the protruding areas 25 of the microspheres. The various characterizations of embedded reflective layers in terms of percent area coverage, angular arcs, and so on, will be understood to be applicable in similar manner to isolated reflective layers in intermediate articles in which a binder layer has not yet been disposed to form the final article.

In some embodiments, an intermediate article may comprise an intervening layer 50 of the general type described elsewhere herein. Other layers (e.g. color layers 40, bonding layers 120, and/or a substrate 130) may be included in the intermediate article as desired. Any such carrier layer 110 as disclosed herein may be disposable, which term broadly encompasses carrier layers that are removed before actual use of the retroreflective article, after which the carrier layer is disposed, recycled, repurposed, and so on.

An intermediate article, comprising transparent microspheres with isolated reflective layers thereon, can be further processed as desired. In some embodiments, a binder layer e.g. comprising any desired colorant may be disposed onto the microsphere-bearing carrier layer in order to form an article 1. Intermediate articles of any suitable configuration may be shipped to customers who may, for example, dispose binder layers thereon to form customized articles.

Discussions herein have primarily concerned retroreflective articles in which areas 24 of microspheres 21 that are exposed (i.e., that protrude) forwardly of binder 10, are exposed to an ambient atmosphere (e.g., air) in the final retroreflective article as used. In other embodiments, the exposed areas 24 of microspheres 21 may be covered by, and/or reside within, a cover layer that is a permanent component of article 1. Such articles will be termed encapsulated-lens retroreflective articles. In such cases, the transparent microspheres may be chosen to comprise a refractive index that performs suitably in combination with the refractive index of the cover layer. In various embodiments, in an encapsulated-lens retroreflective article, the microspheres 21 may comprise a refractive index (e.g. obtained through the composition of the material of the microspheres, and/or through any kind of surface coating present thereon) that is at least 2.0, 2.2, 2.4, 2.6, or 2.8. In some embodiments, a cover layer of an encapsulated-lens retroreflective may comprise sublayers. In such cases, the refractive indices of the microspheres and the sublayers may be chosen in combination.

In some embodiments, such a cover layer may be a transparent layer. In other embodiments, the entirety, or selected regions, of a cover layer may be colored (e.g. may include one or more colorants) as desired. In some embodiments, a cover layer may take the form of a pre-existing film or sheet that is disposed (e.g. laminated) to at least selected areas of the front side of article 1. In other embodiments, a cover layer may be obtained by printing, coating or otherwise depositing a cover layer precursor onto at least selected areas of the front side of article 1, and then transforming the precursor into the cover layer.

As noted earlier herein, in some embodiments a color layer 40 may perform wavelength-selective absorption of electromagnetic radiation at least somewhere in a range that includes visible light, infrared radiation, and ultraviolet radiation, by the use of a colorant that is disposed in the color layer. The term colorant broadly encompasses pigments and dyes. Conventionally, a pigment is considered to be a colorant that is generally insoluble in the material in which the colorant is present and a dye is considered to be a colorant that is generally soluble in the material in which the colorant is present. However, there may not always be a bright-line distinction as to whether a colorant behaves as a pigment or a dye when dispersed into a particular material. The term colorant thus embraces any such material regardless of whether, in a particular environment, it is considered to be a dye or a pigment. Suitable colorants are described and discussed in detail in the aforementioned U.S. Provisional Patent Application 62/675,020.

Transparent microspheres 21 as used in any article disclosed herein may be of any suitable type. The term "transparent" is generally used to refer to a body (e.g. a glass microsphere) or substrate that transmits at least 50% of electromagnetic radiation at a selected wavelength or within a selected range of wavelengths. In some embodiments, the transparent microspheres may transmit at least 75% of light in the visible light spectrum (e.g., from about 400 nm to about 700 nm); in some embodiments, at least about 80%; in some embodiments, at least about 85%; in some embodiments, at least about 90%; and in some embodiments, at least about 95%. In some embodiments, the transparent microspheres may transmit at least 50% of radiation at a selected wavelength (or range) in the near infrared spectrum (e.g. from 700 nm to about 1400 nm). In various embodiments, transparent microspheres may be made of e.g. inorganic glass, and/or may have a refractive index of e.g. from 1.7 to 2.0. (As noted earlier, in encapsulated-lens arrangements, the transparent microspheres may be chosen to have a higher refractive index as needed.) In various embodiments, the transparent microspheres may have an average diameter of at least 20, 30, 40, 50, 60, 70, or 80 microns. In further embodiments, the transparent microspheres may have an average diameter of at most 200, 180, 160, 140 120, 100, 80, or 60 microns. The vast majority (e.g. at least 90% by number) of the microspheres may be at least generally, substantially, or essentially spherical in shape. However, it will be understood that microspheres as produced in any real-life, large-scale process may comprise a small number of microspheres that exhibit slight deviations or irregularities in shape. Thus, the use of the term "microsphere" does not require that these items must be e.g. perfectly or exactly spherical.

U.S. Patent Application Publication Nos. 2017/0276844 and 2017/0293056, which are incorporated by reference in their entirety herein, discuss methods of characterizing retroreflectivity according to e.g. a coefficient of retroreflectivity ($R_A$). In various embodiments, at least selected areas of retroreflective articles as disclosed herein may exhibit a coefficient of retroreflectivity, measured (at 0.2 degrees observation angle and 5 degrees entrance angle) in accordance with the procedures outlined in these Publications, of at least 50, 100, 200, 250, 350, or 450 candela per lux per square meter. In some embodiments, the $R_A$ may be highest when measured at a "head-on" entrance angle (e.g. 5 degrees). In other embodiments, the $R_A$ may be highest when measured at a "glancing" entrance angle (e.g. 50 degrees, or even 88.76 degrees).

In various embodiments, retroreflective articles as disclosed herein may meet the requirements of ANSI/ISEA 107-2015 and/or ISO 20471:2013. In many embodiments, retroreflective articles as disclosed herein may exhibit satisfactory, or excellent, wash durability. Such wash durability may be manifested as high $R_A$ retention (a ratio between $R_A$ after wash and $R_A$ before wash) after numerous (e.g. 25) wash cycles conducted according to the method of ISO 6330

2A, as outlined in U.S. Patent Application Publication No. 2017/0276844. In various embodiments, a retroreflective article as disclosed herein may exhibit a percent of $R_A$ retention of at least 30%, 50%, or 75% after 25 such wash cycles. In various embodiments, a retroreflective article as disclosed herein may exhibit any of these retroreflectivity-retention properties in combination with an initial $R_A$ (before washing) of at least 100 or 330 candela per lux per square meter, measured as noted above.

A retroreflective article as disclosed herein may be used for any desired purpose. In some embodiments, a retroreflective article as disclosed herein may be configured for use in or with a system that performs e.g. machine vision, remote sensing, surveillance, or the like. Such a machine vision system may rely on, for example, one or more visible and/or near-infrared (IR) image acquisition systems (e.g. cameras) and/or radiation or illumination sources, along with any other hardware and software needed to operate the system. Thus in some embodiments, a retroreflective article as disclosed herein (whether or not it is mounted on a substrate) may be a component of, or work in concert with, a machine vision system of any desired type and configuration. Such a retroreflective article may, for example, be configured to be optically interrogated (whether by a visual-wavelength or near-infrared camera, e.g. at a distance of up to several meters, or even up to several hundred meters) regardless of the ambient light conditions. Thus in various embodiments, such a retroreflective article may comprise retroreflective elements configured to collectively exhibit any suitable image(s), code(s), pattern, or the like, that allow information borne by the article to be retrieved by a machine vision system. Exemplary machine vision systems, ways in which retroreflective articles can be configured for use in such systems, and ways in which retroreflective articles can be characterized with specific regard to their suitability for such systems, are disclosed in U.S. Provisional Patent Application No. 62/536,654, which is incorporated by reference in its entirety herein.

In some embodiments, embedded reflective layers 30, color layers 40, and/or a cover layer (e.g. in the particular embodiment in which an article is an encapsulated-lens retroreflective article) may be provided in various macroscopic areas of a retroreflective article rather than collectively occupying the entirety of the article. Such arrangements can allow images to be visible in retroreflected light (whether such images stand out by way of increased retroreflectivity and/or by way of an enhanced color). In some embodiments, such images may be achieved e.g. by performing patterned deposition of the reflective layers. As noted earlier herein, in various embodiments a retroreflective article as disclosed herein may be configured to exhibit images when viewed in retroreflected light, to exhibit images when viewed in ambient light, or both. If both are present, the images when viewed in ambient light may be generally the same as those when viewed in retroreflected light (e.g. an article may convey the same information under both conditions); or the images may be different (e.g. so that different information is conveyed in ambient light versus in retroreflected light).

Various components of retroreflective articles (e.g. transparent microspheres, binder layers, reflective layers, etc.), methods of making such components and of incorporating such components into retroreflective articles in various arrangements, are described e.g. in U.S. Patent Application Publication Nos. 2017/0131444, 2017/0276844, and 2017/0293056, and in U.S. Provisional Patent Application No. 62/578,343, all of which are incorporated by reference in their entirety herein.

It will be appreciated that retroreflective elements comprising embedded reflective layers as disclosed herein, can be used in any retroreflective article of any suitable design and for any suitable application. In particular, it is noted that the requirement of the presence of retroreflective elements comprising transparent microspheres (along with one or more color layers, reflective layers, etc.) does not preclude the presence, somewhere in the article, of other retroreflective elements (e.g. so-called cube-corner retroreflectors) that do not comprise transparent microspheres.

Although discussions herein have mainly concerned use of the herein-described retroreflective articles with garments and like items, it will be appreciated that these retroreflective articles can find use in any application, as mounted to, or present on or near, any suitable item or entity. Thus, for example, retroreflective articles as disclosed herein may find use in pavement marking tapes, road signage, vehicle marking or identification (e.g. license plates), or, in general, in reflective sheeting of any sort. In various embodiments, such articles and sheeting comprising such articles may present information (e.g. indicia), may provide an aesthetic appearance, or may serve a combination of both such purposes.

LIST OF EXEMPLARY EMBODIMENTS

Embodiment 1 is a retroreflective article comprising: a binder layer; and, a plurality of retroreflective elements spaced over a length and breadth of a front side of the binder layer, each retroreflective element comprising a transparent microsphere partially embedded in the binder layer so as to exhibit an embedded surface area of the transparent microsphere; wherein the article is configured so that at least some of the retroreflective elements each comprise a reflective layer that is embedded between the transparent microsphere and the binder layer and wherein at least some of the embedded reflective layers of the retroreflective article are localized reflective layers; wherein each localized, embedded reflective layer covers a portion of the embedded surface area of the transparent microsphere that is less than the entirety of the embedded surface area of the transparent microsphere.

Embodiment 2 is the retroreflective article of embodiment 1 wherein the article is configured so that at least 60% of the embedded reflective layers of the retroreflective article are localized reflective layers.

Embodiment 3 is the retroreflective article of any of embodiments 1-2 wherein the article is configured so that at least some of the localized, embedded reflective layers each cover a portion of the embedded surface area of the transparent microsphere that is less than 60% of the embedded surface area of the transparent microsphere.

Embodiment 4 is the retroreflective article of any of embodiments 1-3 wherein the article is configured so that at least some of the localized, embedded reflective layers each cover a portion of the embedded surface area of the transparent microsphere in such manner that the covered portion of the embedded surface area of the transparent microsphere is less than 50% of a total surface area of the transparent microsphere.

Embodiment 5 is the retroreflective article of any of embodiments 1-3 wherein the article is configured so that at least some of the localized, embedded reflective layers each cover a portion of the embedded surface area of the transparent microsphere in such manner that the covered portion of the embedded surface area of the transparent microsphere is less than 25% of a total surface area of the transparent microsphere.

Embodiment 6 is the retroreflective article of any of embodiments 1-5 wherein the localized, embedded reflective layers each occupy an angular arc of at most 180 degrees.

Embodiment 7 is the retroreflective article of any of embodiments 1-5 wherein at least some of the localized, embedded reflective layers occupy an angular arc of, on average, from greater than 5 degrees to at most 50 degrees.

Embodiment 8 is the retroreflective article of any of embodiments 1-7 wherein the article is configured to comprise at least some transparent microspheres that do not comprise reflective layers disposed thereon, and wherein the transparent microspheres that comprise embedded reflective layers make up from at least 5 percent to at most 95 percent of the total number of transparent microspheres of the retroreflective article.

Embodiment 9 is the retroreflective article of any of embodiments 1-8 wherein at least some of the retroreflective elements comprise an intervening layer at least a portion of which is disposed between the transparent microsphere and the binder layer so that a localized, embedded reflective layer is positioned between the intervening layer and the binder layer.

Embodiment 10 is the retroreflective article of any of embodiments 1-9 wherein the binder layer comprises a colorant.

Embodiment 11 is the retroreflective article of any of embodiments 1-10 wherein at least some of the retroreflective elements comprise a localized layer that is an embedded layer that is embedded between the transparent microsphere and the localized, embedded reflective layer.

Embodiment 12 is the retroreflective article of any of embodiments 1-11 wherein at least some of the localized, embedded reflective layers comprise a metal reflecting layer.

Embodiment 13 is the retroreflective article of any of embodiments 1-12 wherein at least some of the localized, embedded reflective layers comprise a reflecting layer that is a dielectric reflective layer comprising alternating high and low refractive index sublayers.

Embodiment 14 is the retroreflective article of any of embodiments 1-13 wherein the article exhibits an initial coefficient of retroreflectivity ($R_A$, measured at 0.2 degrees observation angle and 5 degrees entrance angle), in the absence of being exposed to a wash cycle, of at least 100 candela per lux per square meter.

Embodiment 15 is the retroreflective article of any of embodiments 1-14 wherein the article exhibits a coefficient of retroreflectivity ($R_A$, measured at 0.2 degrees observation angle and 5 degrees entrance angle) after 25 wash cycles, that is at least 30% of an initial coefficient of retroreflectivity in the absence of being exposed to a wash cycle.

Embodiment 16 is the retroreflective article of any of embodiments 1-15 wherein the binder layer comprises less than 7.0 wt. percent nacreous reflective particles.

Embodiment 17 is the retroreflective article of any of embodiments 1-15 wherein the binder layer comprises less than 4.0 wt. percent nacreous reflective particles.

Embodiment 18 is the retroreflective article of any of embodiments 1-15 wherein the binder layer comprises less than 2.0 wt. percent nacreous reflective particles.

Embodiment 19 is the retroreflective article of any of embodiments 1-15 wherein the binder layer comprises less than 0.5 wt. percent nacreous reflective particles.

Embodiment 20 is the retroreflective article of any of embodiments 1-15 wherein the binder layer comprises from 0.2 wt. % to 7.5 wt. % nacreous reflective particles.

Embodiment 21 is the retroreflective article of any of embodiments 1-20 wherein the article is configured so that at least some of the localized, embedded reflective layers each cover a portion of the embedded surface area of the transparent microsphere that is less than 40% of the embedded surface area of the transparent microsphere.

Embodiment 22 is the retroreflective article of any of embodiments 1-20 wherein the article is configured so that at least some of the localized, embedded reflective layers each cover a portion of the embedded surface area of the transparent microsphere that is less than 20% of the embedded surface area of the transparent microsphere.

Embodiment 23 is the retroreflective article of any of embodiments 1-22 wherein the article is configured to comprise at least some transparent microspheres that do not comprise reflective layers disposed thereon, and wherein the transparent microspheres that comprise embedded reflective layers make up from at least 5 percent to at most 80 percent of the total number of transparent microspheres of the retroreflective article.

Embodiment 24 is the retroreflective article of any of embodiments 1-22 wherein the article is configured to comprise at least some transparent microspheres that do not comprise reflective layers disposed thereon, and wherein the transparent microspheres that comprise embedded reflective layers make up from at least 5 percent to at most 60 percent of the total number of transparent microspheres of the retroreflective article.

Embodiment 25 is the retroreflective article of any of embodiments 1-24 wherein the embedded reflective layers are nonuniform reflective layers configured so that the percent area coverage of embedded surface areas of transparent microspheres by the embedded reflective layers exhibits a coefficient of variation greater than 0.05.

Embodiment 26 is the retroreflective article of any of embodiments 1-24 wherein the embedded reflective layers are nonuniform reflective layers configured so that the percent area coverage of embedded surface areas of transparent microspheres by the embedded reflective layers exhibits a coefficient of variation greater than 0.10.

Embodiment 27 is the retroreflective article of any of embodiments 1-24 wherein the embedded reflective layers are nonuniform reflective layers configured so that the percent area coverage of embedded surface areas of transparent microspheres by the embedded reflective layers exhibits a coefficient of variation greater than 0.20.

Embodiment 28 is the retroreflective article of any of embodiments 1-27 wherein at least 50% of the retroreflective elements each comprise a reflective layer that is embedded between the transparent microsphere and the binder layer.

Embodiment 29 is the retroreflective article of any of embodiments 1-27 wherein at least 80% of the retroreflective elements each comprise a reflective layer that is embedded between the transparent microsphere and the binder layer.

Embodiment 30 is a transfer article comprising the retroreflective article of any of embodiments 1-29 and a disposable carrier layer on which the retroreflective article is detachably disposed with at least some of the transparent microspheres in contact with the carrier layer.

Embodiment 31 is a substrate comprising the retroreflective article of any of embodiments 1-29, wherein the binder layer of the retroreflective article is coupled to the substrate with at least some of the retroreflective elements of the retroreflective article facing away from the substrate. Embodiment 32 is the substrate of embodiment 31 wherein the substrate is a fabric of a garment. Embodiment 33 is the substrate of embodiment 31 wherein the substrate is a support layer that supports the retroreflective article and that is configured to be coupled to a fabric of a garment.

Embodiment 34 is an intermediate article comprising: a disposable carrier layer with a major surface; a plurality of transparent microspheres partially embedded in the disposable carrier layer so that the transparent microspheres exhibit protruding surface areas; and wherein at least some of the transparent microspheres each comprise an isolated reflective layer that is present on a portion of the protruding surface area of the transparent microsphere.

Embodiment 35 is the intermediate article of embodiment 34 wherein at least some of the transparent microspheres further comprise at least one intervening layer, at least a portion of which is disposed between the transparent microsphere and the isolated reflective layer.

Embodiment 36 is the intermediate article of any of embodiments 34-35 wherein the isolated reflective layers of the intermediate article are nonuniform reflective layers configured so that the percent area coverage of protruding surface areas of transparent microspheres by the locally-laminated, isolated reflective layers exhibits a coefficient of variation greater than 0.05.

Embodiment 37 is the intermediate article of any of embodiments 34-35 wherein the isolated reflective layers of the intermediate article are nonuniform reflective layers configured so that the percent area coverage of protruding surface areas of transparent microspheres by the locally-laminated, isolated reflective layers exhibits a coefficient of variation greater than 0.10.

Embodiment 38 is a method of making a retroreflective article comprising a plurality of retroreflective elements at least some of which comprise an embedded reflective layer, the method comprising: disposing reflective layers or reflective layer precursors onto portions of protruding areas of at least some transparent microspheres that are borne by a carrier layer and that are partially embedded therein; then, if reflective layer precursors are present, transforming the reflective layer precursors into reflective layers; then, disposing a binder precursor on the carrier layer and on the protruding areas of the transparent microspheres; then, solidifying the binder precursor to form a retroreflective article comprising a binder layer and in which the reflective layers are embedded between the transparent microspheres and the binder layer in such manner that at least some of the embedded reflective layers are localized reflective layers and so that each embedded reflective layer covers a portion of an embedded surface area of the transparent microsphere that is less than the entirety of the embedded surface area of the transparent microsphere.

Embodiment 39 is the method of embodiment 38 wherein the disposing of reflective layers or reflective layer precursors onto portions of protruding areas of at least some transparent microspheres that are borne by a carrier layer and that are partially embedded therein, comprises: printing reflective layer precursors onto the portions of the protruding areas of some of the transparent microspheres; and, wherein the transforming the reflective layer precursors into localized reflective layers comprises solidifying the printed reflective layer precursors to form localized reflective layers.

Embodiment 40 is the method of embodiment 38 wherein the disposing of reflective layers or reflective layer precursors onto portions of protruding areas of at least some transparent microspheres that are borne by a carrier layer and that are partially embedded therein, comprises: disposing etchable reflective layers onto the protruding areas of the transparent microspheres; then, disposing an etch-resistant masking material onto portions of the etchable reflective layers that are disposed on the protruding areas of the transparent microspheres; then, etching away portions of the etchable reflective layers that are not masked by the etch-resistant masking material, to leave behind localized reflective layers.

Embodiment 41 is a retroreflective article of any of embodiments 1-29, made by the method of any of embodiments 38-40.

Embodiment 42 is a method of making an intermediate article comprising a plurality of transparent microspheres at least some of which comprise an isolated reflective layer, the method comprising: disposing reflective layers or reflective layer precursors onto portions of protruding areas of at least some transparent microspheres that are borne by a carrier layer and that are partially embedded therein; and, if reflective layer precursors are present, transforming the reflective layer precursors into reflective layers.

Examples

| Materials | |
|---|---|
| Designation | Description |
| Resin 1 | A co-polyester solution under the trade designation VITEL ™ 3580 from Bostik Company (Wauwatosa, WI). |
| Resin 2 | A co-polyester solution under the trade designation VITEL ™ VPE-5833 from Bostik Company (Wauwatosa, WI). |
| SILANE-1 | A gamma-isocyanatopropyltriethoxysilane under the trade name SILQUEST A-1310 OR A-LINK 25, available from Momentive Performance Materials Inc., Albany, NY. |
| ICN 1 | A liquid aromatic polyisocyanide polymer based on toluene diisocyanate, under the trade designation DESMODUR L-75 from Covelco, Pittsburgh, PA. |
| Pigment 1 | A fluorescent lime-yellow pigment powder under the trade designation GT-17 SATURN YELLOW from Day Glo Color Corporation, Cleveland, Ohio. |
| CAT 1 | A liquid catalyst based on Dibutyltin dilaurate under the trade designation DABCO ™ T-12 from Evonik GmbH, Essen, Germany. |
| MEK | Methyl ethyl ketone (reagent grade) |
| MIBK | Methyl isobutyl ketone (reagent grade) |
| Ink-1 | Silver ink under the trade name PChem PFI-722 silver Ink from Novacentrix, Austin, TX. |
| Ink-2 | A silver ink under the trade name TEC-PR-010 ink from Inktec, Inc. Gyeonggi-do, Korea |

Materials -continued

| Designation | Description |
| --- | --- |
| Ink-3 | Etch and plating resist ink under the trade name Nazdar 16935PC Etch & Plating Resist Black from Nazdar Ink Technologies, Shawnee, KS |
| Xylene | Dimethylbenzene (reagent grade) |
| Etchant-1 | A 50 mM/100 mM mixture of reagent grade ferric nitrate and thoiurea |
| Ink-4 | Red ink under the trade name Nazdar 9313 Base Warm Red BW5 from Nazdar Ink Technologies, Shawnee, KS. |
| Acrylate-1 | An acrylate liquid based on tricyclodecane dimethanol diacrylate, under the trade name of SARTOMER SR833S from Sartomer USA (Exton, PA) |
| Heatseal Film -1 | An aluminized biaxially-oriented polypropylene film under the trade name TorayFAN PMX2 commercially available from Toray Plastics (America), Inc. (North Kingstown, RI) |
| Resin 3 | A linear, triblock copolymer based on styrene and isoprene with a polystyrene content of 19% under the trade name Kraton D1114 commercially available from Kraton Corporation (Houston, TX) |
| Resin 4 | A polyolefin plastomer resin under the trade name Affinity 1850 from The Dow Chemical Company (Midland, MI) |
| Silane 2 | A butylaminopropyltrimethoxy silane under the trade name Dynasylan 1189 commercially available from Evonik Industries (Essen, Germany) |
| Resin 5 | An acidic acrylate oligomer under the trade name of SARTOMER CN147 from Sartomer USA (Exton, PA) |
| Pigment 2 | A titanium dioxide based pigment under the trade name Dupont Ti-Pure R706 available from The Chemours Company (Wilmington, DE) |
| Pigment 3 | A black pigment under the trade name Orasol Black X51, Florham Park, NJ |

Test Methods

Retroreflectivity Measurement

Articles were evaluated for retroreflectivity performance by measuring the coefficient of retroreflectivity using a RoadVista 933 retroreflectometer (RoadVista, San Diego, Calif.).

The coefficient of retroreflectivity ($R_A$) is described in U.S. Pat. No. 3,700,305:

$R_A = E_1 * d^2 / E_2 * A$ $R_A$ = retroreflective intensity $E_1$ = illumination incident upon the receiver $E_2$ = illumination incident upon a plane perpendicular to the incident ray of the specimen position, measured in the same units as $E_1$ d = distance from the specimen to the projector A = area of the test surface The retroreflectivity measurement test procedure followed the test criteria described in ASTM E8 10-03 (2013)—Standard Test Method for Coefficient of Retroreflective Sheeting using the Coplanar Geometry. Retroreflective units are reported in cd/lux/m². High visibility safety apparel standards such as ANSI/ISEA 107-2010 and ISO 20471:2013 require minimum retroreflective coefficient performance at specific combinations of entrance and observation angle. Entrance angle is defined as the angle between the illumination axis and the retroreflector axis. The observation angle is defined as the angle between the illumination axis and the observation axis. Unless otherwise stated, the entrance angle was 5 degrees, and the observation angle was 0.2 degrees. In some cases, samples were evaluated in a "32-angle" test battery of the type described in Table 5 of ISO 20471:2013 and often used in the evaluation of e.g. safety apparel. In such testing, the observation angle, the entrance angle, and the orientation of the sample (0 or 90 degrees) is varied. It will be understood, however, that not all uses will necessarily require a retroreflective article to meet this particular standard.

Color Measurement

The color of a retroreflective article can be described in terms of a luminance-chromaticity color space (Yxy), where Y is the color luminance, and x and y are chromaticity coordinates. These values are related to the CIE XYZ color space (International Commission on Illumination (CIE 1931)):

$x = X/(X+Y+Z)$ $y = Y/(X+Y+Z)$

The advantage of using Yxy color space is that the chromaticity can be plotted on a chart, usually called the CIE x-y chromaticity diagram. This color representation/nomenclature is used in high visibility safety apparel regulatory standards such as ANSI/ISEA 107-2010 and ISO 20471: 2013. The color measurement procedure is in accordance with the procedure outlined in ASTM E 308-90, where the following operating parameters are as set forth below:

Standard illuminant: D65 daylight illuminant

Standard observer: CIE (International Commissioner of Illumination) 1931 2°

Wavelength interval: 400-700 nanometers at 10 nanometer intervals

Incident light: 0° on sample plane

Viewing: 45° through a ring of 16 fiber optic receptor stations

Area of view: one inch

Port size: one inch

In certain examples, an alternate color representation (L*a*b*) is used. The definition of this color space is described as CIE L*a*b*1976 color space. Knowing these parameters, a person of ordinary skill can reproduce this test. For a further discussion of the operating parameters see ASTM E 1164-93.

Peel Force

90 Degree Peel Method

Peel force was measured using a T-Peel test according to ASTM D1876-08. Samples measuring 2 inches by 6 inches (50×150 mm) were cut from sheets of coated film and laid coated side up on a smooth clean surface. A piece of Scotch® 3850 Shipping Packaging Tape (3M Corporation, St. Paul, Minn.) was cut measuring about 8 inches (200 mm) long, aligned with the long edge of the sample, and applied to the coated side of the sample with a hard rubber hand roller using firm pressure. Care was taken to avoid the formation of creases or any entrapped air. A 1 inch (25 mm) wide test strip was slit out of the center of the laminated sample, in the long dimension, ensuring the two edge cuts were clean and parallel. The first one-quarter to one-half inch of the laminated test strip was separated and the two separated ends were secured in the grips of a tensile tester which was configured to conduct testing in a T-Peel geometry at a peel rate of 3 inches/minute (75 mm per minute) and record the peel force in grams. The peel was initiated and allowed to continue until at least 4 inches of the test strip length had been separated. The separated surfaces of the test strip were examined to determine location of failure and the peel value was recorded in grams per linear inch.

180 Degree Peel Method

Same sample preparation as for the 90 degree peel method, except the test was constructed in a 180 degree peel geometry with a 2 inch (50 nm) wide test strip.

Method for Making Temporary Bead Carrier Containing Glass Microspheres

In each of the Examples and Comparative Examples, glass microspheres were partially and temporarily embedded in a carrier sheet. The carrier sheet included paper juxtaposed against a polyethylene layer that was about 25 to 50 micrometers thick. The carrier sheet was heated in a convection oven to 220° F. (104° C.), then the microspheres were poured onto polyethylene side of the sheet and left for 60 seconds. The sheet was removed from the oven and allowed to cool to room temperature. Excess beads were poured off the sheet, and the sheet was then placed in an oven at 320° F. (160° C.) for 60 seconds. The sheet was removed from the oven and allowed to cool. The microspheres were partially embedded in the polyethylene layer such that more than 50 percent of the microspheres protruded.

Working Example 2-1

Example 2-1, and Examples 2-2-1 and 2-2-2, describe the use of flexographic printing methods to produce retroreflective articles comprising embedded reflective layers.

The temporary bead carrier as described previously was roll-to-roll flexographically printed with Ink-1, using a flat (i.e. un-patterned and continuous) Dupont Cyrel 67 mil DPR photopolymer flexo plate, a 1.8 billion cubic microns per square inch (BCM/in$^2$) volume anilox roll, and a line speed of 35 fpm (10.8 meters per minute). The plate-to-anilox roll and plate-to-impression roll gaps were initially set to a position such that a continuous pattern of silver ink was transferred from the anilox roll to the plate roll and finally to the temporary bead carrier. The ink transfer efficiency was controlled by adjusting the plate-to-anilox and plate-to-impression roll gaps.

The silver-printed bead carrier was then dried using an infrared unit from Xeric Web Systems (Neenah, Wis.) with nine medium wave lamps set to 100% power at 50 fpm (15.2 meters per minute, power output at power output at 108 joules/in$^2$ (167.4 kJ/m$^2$) at 15.2 meters per minute), followed by two air impingement ovens, each with six drying bars (Flex Air, Green Bay, Wis.), with an air temperature of 275° F. (135° C.) and manifold supply pressure of 15 psi (0.1 MPa). This produced the Printed Bead Carrier-1.

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Printed Bead Carrier-1, using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The dried coating thus formed a binder layer of the general type described earlier herein. The sample was then laminated onto a polyamide fabric using a roll laminator at 220° F. (104.4° C.) at a roller speed of approximately 32 inches per minute (0.8 meter per minute). Inventive Example 2-1 was obtained by removal of the bead carrier sheet, with $R_A$ (at EA/OA of 5/0.2) of 274, Y of 63.0, x of 0.3952, and y of 0.5176.

Working Examples 2-2-1 and 2-2-2

The temporary bead carrier as described previously was roll-to-roll flexographically printed with Ink-2, using a flat (i.e. un-patterned and continuous) Dupont Cyrel 67 mil DPR photopolymer flexo plate, a 4.0 BCM/in$^2$ volume anilox roll, and a line speed of 20 fpm (6.1 meters per minute). The plate-to-anilox roll and plate-to-impression roll gaps were initially set to a position such that a continuous pattern of silver ink was transferred from the anilox roll to the plate roll and finally to the temporary bead carrier. The ink transfer efficiency was controlled by adjusting the plate-to-anilox and plate-to-impression roll gaps.

The printed bead carrier was then dried using two infrared units from Xeric Web Systems (Neenah, Wis.), each with nine medium wave lamps set to 100% power at 20 fpm (6.1 meters per minute), power output at 135 joules/in$^2$ (209.3 kJ/m$^2$), followed by two air impingement ovens, each with six drying bars (Flex Air, Green Bay, Wis.), with an air temperature of 275° F. (135° C.) and manifold supply pressure of 15 psi (0.1 MPa). This produced the Printed Bead Carrier-2.

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Printed Bead Carrier-2 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-2-1 was obtained by removal of the bead carrier sheet, with $R_A$ of 249, Y of 26.2, x of 0.3788, and y of 0.4772.

The Printed Bead Carrier-2 was further cut to approximately 6×8 inch (150×200 millimeters) coupons and flash lamp sintered with a Xenon S-2100 16" linear lamp system (Xenon Corporation, Wilmington Mass.). Flash lamp treated samples were exposed to successive pulses from the linear xenon flash tube while being translated under the tube. The samples were translated in a direction orthogonal to the axis of the tube in synchronization with the timing of light pulses so as to treat the entire area of each sample according to the following defined pulse design: speed of 9 mm/s, step of 18 mm, voltage of 3 kV, and pulse duration of 2.5 ms. The lamp was also defocused to create a wider exposure area by increasing the distance from the substrate by 1 inch from the optimal lamp height. This produced the Printed Bead Carrier-3.

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Printed Bead Carrier-3 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-2-2 was obtained by removal of the bead carrier sheet, and was tested and found to exhibit $R_A$ of 534, Y of 41.8, x of 0.3858, and y of 0.4861.

Working Example 2.3

Example 2.3 describes the use of local lamination methods to produce retroreflective articles comprising embedded reflective layers. This Example uses a conformal (elastomeric) substrate (referred to in the Example as an elastomeric transfer adhesive) to assist in the local lamination.

The following examples describe five general parts:
A. Making an article that has a multi-layer transferrable reflector layer
B. Making an elastomeric transfer adhesive
C. Transferring the reflector layer from (A) to (B)
D. Transferring the reflector layer from (C) to a bead carrier
E. Making a retroreflective article from (D)

Example 2.3.1

2.3.1.A (Part A)
Optical films were made on a vacuum coater similar to the coater described in U.S. Pat. No. 8,658,248 (Anderson et al.) and U.S. Pat. No. 7,018,713 (Padiyath, et al.). This coater was threaded up with a substrate in the form of an indefinite length roll of 980 microinch (0.0250 mm) thick, 14 inch (35.6 cm) wide Heatseal Film-1. This substrate was then advanced at a constant line speed of 32 fpm (9.8 m/min).

A first organic layer was formed on the substrate by applying Acrylate-1, by ultrasonic atomization and flash evaporation to make a coating width of 12.5 inches (31.8 cm). This monomeric coating was subsequently cured immediately downstream with an electron beam curing gun operating at 7.0 kV and 10.0 mA. The flow of liquid monomer into the evaporator was 0.67 ml/min, the nitrogen gas flow rate was 100 sccm and the evaporator temperature was set at 500° F. (260° C.). The process drum temperature was 14° F. (−10° C.).

On top of this first organic layer, a silver reflecting layer was deposited by DC sputtering of a >99% silver cathode target. The system was operated at 3 kW with a 30 fpm (9.1 meters per minute) line speed. Two subsequent depositions with the same power and line-speed were done to create a 90 nm layer of silver.

On top of this silver layer, an oxide layer of silicon aluminum oxide was deposited by AC reactive sputtering. The cathode had a Si(90%)/Al(10%) target obtained from Soleras Advanced Coatings US, of Biddeford, (ME). The voltage for the cathode during sputtering was controlled by a feed-back control loop that monitored the voltage and controlled the oxygen flow such that the voltage would remain high and not crash the target voltage. The system was operated at 16 kW of power to deposit a 12 nm thick layer of silicon aluminum oxide onto the silver reflecting layer. (Silicon aluminum oxide may be referred to herein as $SiAlO_x$ for convenience; this does not signify any particular stoichiometric ratio of any of the components.)

The aluminum surface of the Heatseal Film-1 film and the first organic layer would decouple with a 180 Peel force of 7.2 On (0.283 g per mm).

2.3.1.E (Part B) Making an Elastomeric Transfer Adhesive

Elastomeric transfer adhesive films containing one or more layers were made using cast co-extrusion processes as described in co-extrusion patents such as U.S. Pat. Nos. 5,223,276, 9,327,441 and WO9936248, the disclosures of which are incorporated herein by reference thereto.

3-layer transfer films: A 3-layer feed block (ABA plug) in combination with a single layer manifold die (10-inch (254 mm) width) was used to generate 3-layer films with an elastomeric core and polyolefin plastomer skin. The elastomeric core was made using Resin 3 and the polymer plastomer skin using Resin 4. The core material was melted at 400° F. (204° C.) in a single screw extruder and fed into one of the inlets of the 3-layer feed block, while the skin material was melted at 360° F. (182° C.) in a twin-screw extruder and fed into a second inlet in the feed block where it split into two streams to encapsulate the core layer on both sides. The composite film was then cast directly from the die onto a chilled roll maintained at 60-70° F. (15-21° C.). The caliper and core-skin ratio was varied by adjusting the line speed of the winder unit and changing the configuration of the floating vanes in the feed block respectively. Multilayer films with thickness ranging from 0.002-0.005 inches (0.051-0.127 mm) and core-skin ratio ranging from 10-30 were produced and used for the transfer process.

2.3.1.0 (Part C)
The three-layer elastomer adhesive was laminated to the article described in Part A using an Akiles ProLam Plus 330 13" Pouch Laminator (Mira Loma,) with a setpoint of 171° F. (77° C.) with the $SiAlO_x$ surface in contact with the elastomer transfer adhesive surface. The Heatseal Film 1 was removed from the construction and discarded. The 180 Peel test showed that the multilayer film of acrylate/Ag/ $SiAlO_x$ could be removed from the surface of the planar elastomer with peel forces of 25 On (0.98 g/mm).

2.3.1.D (Part D)
A solution containing 6.18 parts Resin1, 0.13 parts SILANE-1, 0.5 parts ICN 1, and 33.41 parts MEK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the temporary bead carrier using a notch-bar coater gapped at 51 micrometers. The sample was dried for 3 minutes at 150° F. (65.5° C.) with an additional curing for 4 minutes at 200° F. (93.3° C.). This produced the Polymer Coated Bead Carrier.

The elastomeric transfer adhesive with the weakly bound acrylate/Ag/$SiAlO_x$ multilayer optical reflector film was pressed against the Polymer Coated Bead Carrier at 180° F. (82° C.) with a lamination force of 40 lb/in (714 g/mm) of lamination force. In this step, the acylate surface makes contact with the polymer surface of the polymer coated bead carrier. Then the elastomeric transfer adhesive was pulled away from the Polymer Coated Bead Carrier to produce the Transferred Bead Carrier-1.

2.3.1.E (Part E)

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-1 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-3-1 was obtained by removal of the bead carrier sheet, and was tested and found to exhibit $R_A$ of 616, Y of 52.9, x of 0.3642, and y of 0.4795. Table 2.3.1 presents the results of a "32-angle" test. Although not noted explicitly in the Table, each pair of observations (at identical observation angles and identical entrance angles) are for orientation angles of 0 and 90 degrees. The obtained results (the rightmost column of Table 2.3.1) are compared to the ANSI minimum specification.

TABLE 2.3.1

| Observation Angle (degrees) | Entrance Angle (degrees) | ANSI/ISE A 107 Minimum Spec. | $R_A$ (cd/lx-m$^2$) |
|---|---|---|---|
| 0.2 | 5 | 330 | 609 |
| 0.2 | 5 | 330 | 616 |
| 0.2 | 20 | 290 | 467 |
| 0.2 | 20 | 290 | 525 |
| 0.2 | 30 | 180 | 349 |
| 0.2 | 30 | 180 | 408 |
| 0.2 | 40 | 65 | 264 |
| 0.2 | 40 | 65 | 324 |
| 0.33 | 5 | 250 | 373 |
| 0.33 | 5 | 250 | 379 |
| 0.33 | 20 | 200 | 292 |
| 0.33 | 20 | 200 | 327 |
| 0.33 | 30 | 170 | 228 |
| 0.33 | 30 | 170 | 258 |
| 0.33 | 40 | 60 | 190 |
| 0.33 | 40 | 60 | 217 |
| 1 | 5 | 25 | 52.1 |
| 1 | 5 | 25 | 51.7 |
| 1 | 20 | 15 | 39.9 |
| 1 | 20 | 15 | 45.2 |
| 1 | 30 | 12 | 31.5 |
| 1 | 30 | 12 | 36.9 |
| 1 | 40 | 10 | 23 |
| 1 | 40 | 10 | 28 |
| 1.5 | 5 | 10 | 15.9 |
| 1.5 | 5 | 10 | 16.4 |
| 1.5 | 20 | 7 | 13.7 |
| 1.5 | 20 | 7 | 14.9 |
| 1.5 | 30 | 5 | 11.4 |
| 1.5 | 30 | 5 | 12.8 |
| 1.5 | 40 | 4 | 10.7 |
| 1.5 | 40 | 4 | 10.2 |

Example 2.3.2

As in Example 2-3-1, except:

In 2.3.2.B (Part B) a single layer elastomeric transfer adhesive was made in a 6-inch single manifold die using Resin 3. The raw material was melted in a single screw extruder at 400° F. (204° C.) and cast onto a chilled roll maintained at room temperature. Films with thicknesses ranging from 0.001-0.004 inches (0.025-0.1 mm) were produced by adjusting the line speed of the winder unit and used for the mirror transfer process. This material allowed the lamination of 2.3.2.0 and 2.3.2.D (Part C and D) to be done at 77° F. (25° C.) without additional heating. In 2.3.2.D (Part D) if less than 40 lb/in (714 g/mm) lamination force was used, less than full-transfer, or partial transfer, of the mirror was facilitated. This led to lower retroreflectivity ($R_A$=ranging from 20 to 400 cdlx-m$^2$) with the value dependent on the pressure used. Then the elastomeric transfer adhesive was pulled away from the Polymer Coated Bead Carrier to produce the Transferred Bead Carrier-2.

Example 2.3.3

2.3.3.A (Part A)

A transfer multilayer optical reflector was prepared as follows:

A transfer reflector film is described and was made on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658,248 (Anderson and Ramos).

This coater was outfitted with a substrate in the form of a 1000 ft (305 m) length roll of 0.002 in (0.05 mm) thick, 14 inch (35.6 cm) wide polyethylene terephthalate (PET) film manufactured by 3M Company. The substrate was prepared for coating by subjecting it to a nitrogen plasma treatment to improve the adhesion of the metallic layer. The film was treated with a nitrogen plasma operating at 120 W using a titanium cathode, using a web speed of 32 fpm (9.8 meters/min) and maintaining the backside of the film in contact with a coating drum chilled to 14° F. (−10° C.).

On this prepared PET substrate, the release layer of SiAl was deposited in-line with the previous plasma treatment step. The cathode had a Si(90%)/Al(10%) target obtained from Soleras Advanced Coatings US, of Biddeford, (ME). A conventional AC sputtering process employing Ar gas and operated at 24 kW of power was used to deposit a 37 nm thick layer of SiAl alloy onto the substrate. The SiAl coated PET substrate was then rewound.

On this SiAl release layer, a layer of Acrylate-1 was deposited in-line on top of the SiAl layer. The acrylate layer was applied by ultrasonic atomization and flash evaporation to make a coating width of 12.5 inches (31.8 cm). The flow rate of this mixture into the atomizer was 0.33 ml/min to achieve a 94 nm layer, the gas flow rate was 60 standard cubic centimeters per minute (sccm), and the evaporator temperature was 500° F. (260° C.). Once condensed onto the SiAl layer, this monomeric coating was cured immediately with an electron beam curing gun operating at 7.0 kV and 10.0 mA.

On this acrylate layer, an inorganic oxide layer of niobium oxide was applied in a separate pass. The cathode ceramic or suboxide NbOx target obtained from Soleras Advanced Coatings US, of Biddeford, (ME) was used. More specifically, a conventional DC sputtering process operated at 2 kW of power was employed to deposit an approximately 66 nm thick layer of NbOx onto the substrate to form a quarter wave optical thickness at a line speed of 1 fpm (0.3 m/min) using a 450 sccm Ar and 14 sccm O2 gas flow.

On this niobium oxide layer, an acrylate layer was formed. This polymeric layer was produced by atomization and evaporation of a monomer mixture containing 94 parts Acrylate-1, 3 parts Silane-2), and 3 parts Resin-5 in a separate pass on top of the niobium oxide layer. The acrylate layer was applied by ultrasonic atomization and flash evaporation to make a coating width of 12.5 inches (31.8 cm). The flow rate of this mixture into the atomizer was 0.66 ml/min to achieve a 188 nm layer at 32 fpm (9.8 meters per minute), the gas flow rate was 60 standard cubic centimeters per minute (sccm), and the evaporator temperature was 500° F. (260° C.). Once condensed onto the niobium oxide layer, this monomeric coating was cured immediately with an electron beam curing gun operating at 7.0 kV and 10.0 mA.

2.3.3.0 (Part C)

The three-layer elastomer described in 2.3.1.B was laminated to the article described in 2.3.3.A (Part A) at 171° F. (77° C.) and then the SiAl coated PET was removed and discarded.

2.3.3.D (Part D)

The elastomeric transfer adhesive with the weakly bound acrylate/NbOx/Acrylate multilayer optical reflector film was pressed against the Polymer Coated Bead Carrier at 180° F. (82° C.) with a lamination force of 50 lb/in (893 g/mm). In this step, the acylate surface makes contact with the polymer surface of the polymer coated bead carrier. Then the elastomeric transfer adhesive was pulled away from the Polymer Coated Bead Carrier to produce the Transferred Bead Carrier-3.

2.3.3.E (Part E)

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-3 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-3-3 was obtained by removal of the bead carrier sheet. The article has an $R_A$ of 105, Y of 110, x of 0.3569, and y of 0.4805. It will be appreciated that this article comprised a reflecting layer in the guise of a dielectric stack rather than a reflecting metal layer.

Working Example 2.4

Example 2.4 describes the use of local lamination methods to produce retroreflective articles comprising embedded reflective layers. This Example uses direct transfer (without the assistance of a conformal (elastomeric) substrate) lamination methods.

The following direct transfer examples describe three general parts:

A. Making an article that has a multi-layer transferrable reflector layer

B. Transferring the reflector layer from (A) directly to a bead coat

C. Making a retroreflective article from (B)

Example 2.4.1

2.4.1 part A

A transfer mirror film is described in this Example and was made on a roll to roll vacuum coater similar to the coater described in U.S. Patent Application No. 20100316852 with the addition of a second evaporator and curing system located between the plasma pretreatment station and the first sputtering system, and using evaporators as described in U.S. Pat. No. 8,658,248.

This coater was threaded up with a substrate in the form of an indefinite length roll of 0.001 inch (0.0250 mm) thick, 14 inch (356 mm) wide Heatseal Film-1. The metal side of the film was coated using a web speed of 9.8 meters/min and maintaining the backside of the film in contact with a coating drum chilled to −10° C. A layer of Acrylate-1 was deposited in-line on top of the aluminum metalized side of the Heatseal Film-1. The acrylate layer was applied by ultrasonic atomization and flash evaporation to make a coating width of 12.5 inches (31.8 cm). The flow rate of this mixture into the atomizer was 0.67 ml/min to achieve a 188 nm layer, the gas flow rate was 60 standard cubic centimeters per minute (sccm), and the evaporator temperature was 260° C. Once condensed onto the Al layer, this monomeric coating was cured immediately with an electron beam curing gun operating at 7.0 kV and 10.0 mA.

On this acrylate layer, a reflecting layer of Ag was applied using a cathode Ag target (ACI Alloys of San Jose, Calif.). This Ag metal layer was deposited by a conventional DC sputtering process employing Ar gas, operated at 3 kW of power, and at a 9.8 meters/min line speed to per pass for 3 passes to deposit a 60 nm thick layer of Ag.

On this Ag reflecting layer, an inorganic oxide layer was applied. This oxide material was laid down by an AC reactive sputter deposition process employing a 40 kHz AC power supply. The cathode had a Si(90%)/Al(10%) rotary target obtained from Soleras Advanced Coatings US, of Biddeford, (ME). The voltage for the cathode during sputtering was controlled by a feed-back control loop that monitored the voltage and controlled the oxygen flow such that the voltage would remain high and not crash the target voltage. The system was operated at 16 kW of power and 32 fpm to deposit a 12 nm thick layer of silicon aluminum oxide onto the Ag layer.

2.4.1 Part B

The Heatseal Film-1 substrate with the weakly bound acrylate/Ag/SiAlO$_x$ multilayer optical reflector film was pressed against the Polymer Coated Bead Carrier at room temperature with 500 lb/linear inch (87.5 kN/m) of lamination force at 10 fpm (4.2 mm per second). The SiAlO$_x$ surface was in contact with the polymer coated side of the carrier. A silicone rubber sleeve with a 78D hardness backed the Heatseal Film-1 substrate and a steel roll backed the paper side of the Polymer Coated Bead Carrier. After lamination, the Heatseal Film −1 film was removed to produce the Transferred Bead Carrier-4.

2.4.1 Part C

A mixture consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-4 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-4-1 was obtained by removal of the bead carrier sheet, with $R_A$ of 386, Y of 98, x of 0.3531, and y of 0.4810.

Example 2.4.2

A solution consisting of 84 parts Resin 1, 8 parts Pigment 2, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-4 using a laboratory notch bar coater with a 0.008 inch (0.2 mm) gap. The coated sample was dried for 30 seconds at 190° F. (87.8° C.), laminated to a polyester white fabric using a hand roller, then dried for an additional 6 minutes at 215° F. (101.7° C.). Inventive Example 2-4-2 was obtained by removal of the bead carrier sheet, and exhibited $R_A$ of 394, L* of 81.2, a* of −0.9, b* of 1.1.

Example 2.4.3

A solution consisting of 84 parts Resin 1, 4 parts Pigment 3, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-4 using a laboratory notch bar coater with a 0.008 inch (0.2 mm) gap. The coated sample was dried for 30 seconds at 190° F. (87.8° C.), laminated to a polyester white fabric using a hand roller, then dried for an additional 6 minutes at 215° F. (101.7° C.). Inventive Example 2-4-3 was obtained by removal of the bead carrier sheet, with $R_A$ of 277, L* of 25.3, a* of 0.7, b* of −1.3.

Example 2.4.4

A solution consisting of 84 parts Resin 1, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the Transferred Bead Carrier-4 using a laboratory notch bar coater with a 0.008 inch (0.2 mm) gap. The coated sample was dried for 30 seconds at 190° F. (87.8° C.), and an additional 6 minutes at 215° F. (101.7° C.). The coating side of the sample was marked with a colorful graphic image using a permanent ink marker, and then laminated to a white cotton fabric using a hot melt adhesive. Inventive Example 2-4-4 was obtained by removal of the bead carrier sheet, and exhibited $R_A$ of 385. The colorful graphic image was clearly visible on the marked region of Example 2-4-4. Example 2-4-4 had L* of 74.5, a* of 1.0, b* of −5.9 on the unmarked region.

Example 2.4.5

2.4.5 Part A

A transfer mirror film is described in this Example and was made on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658,248 (Anderson and Ramos).

This coater was threaded up with a substrate in the form of an indefinite length roll of 0.001 inch (0.0250 mm) thick, 14 inch (35.6 cm) wide Heatseal Film-1. The metal side of the film was coated using a web speed of 9.8 meters/min and maintaining the backside of the film in contact with a coating drum chilled to 14° F. (−10° C.).

Acrylate-1 was then deposited on top of the aluminum coating of Heatseal Film-1. The acrylate layer was applied using ultrasonic atomization and flash evaporation to make a coating width of 12.5 inches (31.8 cm). The flow rate of this mixture into the atomizer was 0.67 ml/min to achieve a 188 nm layer, the gas flow rate was 60 standard cubic centimeters per minute (sccm), and the evaporator temperature was 260° C. Once condensed onto the Al layer, this monomeric coating was cured immediately with an electron beam curing gun operating at 7.0 kV and 10.0 mA.

On this acrylate layer, a reflecting layer of Ag was applied using a cathode Ag target that was obtained from ACI Alloys of San Jose, Calif. This Ag metal layer was deposited by a conventional DC sputtering process employing Ar gas, operated at 3 kW of power, and at a 9.8 meters/min line speed to per pass for 3 passes deposit a 60 nm thick layer of Ag. This layer showed signs of corrosion if exposed to normal laboratory ambient conditions after one week.

2.4.5 Part B/C

Parts B and C for Inventive Example 2.4.5 used procedures previously described for Inventive Example 2.4.1, except for Part B, the transfer was conducted using a line speed of 3 fpm (0.91 m per minute). Inventive Example 2-4-5 had $R_A$ of 368, Y of 101, x of 0.3916 and a y of 0.5389.

Working Example 3.1.1

Example 3.1.1 describes the use of resist/etch methods to produce retroreflective articles comprising embedded reflective layers.

A temporary bead carrier similar to that described previously was constructed using a PET backing sheet instead of paper.

A solution containing 6.18 parts Resin1, 0.13 parts SILANE-1, 0.5 parts ICN 1, and 33.41 parts MEK was mixed into a MAX 40 Speedmixer cup, and further mixed at 2400 rpm for 60 seconds in a DAC 150.1 FVZ-K Speedmixer (FlackTek Inc, Landrum, S.C.). The solution was coated onto the temporary bead carrier using a notch-bar coater gapped at 51 micrometers. The sample was dried for 3 minutes at 150° F. (65.5° C.) with an additional curing for 4 minutes at 200° F. (93.3° C.). The polymer coated bead carrier was then coated with approximately 100 nanometers of silver metal thin film using a thermal evaporation process in a vacuum coater operating at a vacuum of approximately 0.01 mTorr (1.3 mPa).

The metallized bead carrier was then roll-to-roll flexographically printed with an ink comprising of 72 parts of Ink-3 and 28 parts Xylene, using a flat (i.e. un-patterned and continuous) sleeve with 38 Shore A hardness, a 2.5 BCM/in² volume anilox roll and. The printed sheet was then dried at 135° C. oven for 5 seconds, then spray etched continuously using a roll-to-roll etch line consisting of two festoons, each with two spray bars. An etching solution (Etchant-1) was prepared and continuously sprayed through BEX GS5 nozzles (BEX Inc. Ann Arbor, Mich.). Each spray bar had either 5 (first two bars) or three (last two bars) nozzles and was supplied by a 3 GPM, 45 psi diaphragm pump. Printed samples were etched at a web speed of 2 fpm, which gave a 150 s residence time in the etchant. Samples remained wet for an additional 90 seconds as they traveled to two dipped, deionized water rinses, before finally being dried using air knives.

After drying, an adhesive consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was coated onto the metal reflective layer using a laboratory notch bar coater with a 0.008 inch (0.2 mm) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (813 mm/min).

After drying, the temporary bead carrier was removed to expose the beaded surface of the sample 3.1-1, and both color and retroreflectivity coefficient were measured. The sample exhibited $R_A$ of 497, Y of 56.8, x of 0.3767 and a y of 0.5172.

Working Example 3.1-2

Example 3.1-2 describes the use of resist/etch methods to produce retroreflective articles comprising embedded reflective layers.

A temporary bead carrier as described previously was coated with an approximately 200 nanometer thick layer of silver metal using a thermal evaporator operating at approximately 13 mPa. The resulting article was flexographically printed with Ink-4 using a flat (i.e. un-patterned and continuous) Dupont Cyrel 67 mil DPR photopolymer flexo plate, using a 1.8 BCM/sq inch volume anilox roll and cured by UV light. The printed sheet was then batch spray etched in a test box (Promax QPHA-3 spray nozzles from Spraying Systems Co., Hudson, N.H.) at 20 psi (1.38 MPa). An etching solution (Etchant 1) was used with an etch time of 50 seconds. Samples were rinsed immediately after etching by dipping in deionized water and were subsequently dried under room ambient conditions.

After drying, an adhesive consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was coated onto the metal reflective layer using a laboratory notch bar coater with a 0.008 inch (0.2 mm) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (813 mm/min).

The temporary carrier backing was then removed to expose the beaded surface of the Inventive Example 3.1-2, and both color and retroreflectivity coefficient were measured. Retroreflectivity measurements were taken at combinations of entrance and observation angles described in ANSI/ISEA 107-2015. Measurements are shown in Table 3.1-2. Table 3.1-2 also shows minimum retroreflectivity coefficient requirement for a Class 2 or Class 3 high-visibility safety garment. For Comparative Example 3.1-1, no etching step was performed.

TABLE 3.1.2

| Observation | Entrance | Minimum | Comparative Example 1 | Inventive Example 2 |
|---|---|---|---|---|
| 0.2 | 5 | 330 | 665 | 525 |
| 0.2 | 5 | 330 | 668 | 511 |
| 0.2 | 20 | 290 | 683 | 521 |
| 0.2 | 20 | 290 | 724 | 543 |
| 0.2 | 30 | 180 | 413 | 291 |
| 0.2 | 30 | 180 | 559 | 408 |
| 0.2 | 40 | 65 | 189 | 93 |
| 0.2 | 40 | 65 | 298 | 163 |
| 0.333 | 5 | 250 | 416 | 327 |
| 0.333 | 5 | 250 | 417 | 320 |
| 0.333 | 20 | 200 | 420 | 325 |
| 0.333 | 20 | 200 | 428 | 327 |
| 0.333 | 30 | 170 | 320 | 226 |
| 0.333 | 30 | 170 | 388 | 276 |
| 0.333 | 40 | 60 | 166 | 82.5 |
| 0.333 | 40 | 60 | 241 | 131 |
| 1 | 5 | 25 | 49.5 | 42 |
| 1 | 5 | 25 | 49.3 | 40 |
| 1 | 20 | 15 | 52.5 | 43.7 |
| 1 | 20 | 15 | 52.5 | 43.3 |
| 1 | 30 | 12 | 61.1 | 39.4 |
| 1 | 30 | 12 | 75 | 48.8 |
| 1 | 40 | 10 | 45.7 | 24.9 |
| 1 | 40 | 10 | 55.5 | 28.6 |
| 1.5 | 5 | 10 | 18.7 | 15.3 |
| 1.5 | 5 | 10 | 18.2 | 14.9 |
| 1.5 | 20 | 7 | 18.4 | 14.2 |
| 1.5 | 20 | 7 | 18.3 | 14.9 |
| 1.5 | 30 | 5 | 29.2 | 20.5 |
| 1.5 | 30 | 5 | 25.7 | 16.3 |
| 1.5 | 40 | 4 | 26.6 | 12 |
| 1.5 | 40 | 4 | 25.4 | 13.3 |

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. A retroreflective article comprising:
    a binder layer; and,
    a plurality of retroreflective elements spaced over a length and breadth of a front side of the binder layer, each retroreflective element comprising a transparent microsphere partially embedded in the binder layer so as to exhibit an embedded surface area of the transparent microsphere;
        wherein the article is configured so that at least some of the retroreflective elements each comprise a reflective layer that is embedded between the transparent microsphere and the binder layer and wherein at least some of the embedded reflective layers of the retroreflective article are localized reflective layers;
        wherein each localized, embedded reflective layer covers a portion of the embedded surface area of the transparent microsphere that is less than the entirety of the embedded surface area of the transparent microsphere,
        wherein the localized, embedded reflective layers are irregular and non-circular in shape and are positioned on the transparent microspheres so that, on average, geometric centers of the localized, embedded reflective layers at least generally coincide with forward-rearward centerlines of the transparent microspheres and so that the localized, embedded reflective layers occupy angular arcs of, on average, from at least 15 degrees to less than 60 degrees; and,
        wherein all of the reflective layers of the retroreflective elements of the retroreflective article are metal reflective layers, with the proviso that none of the reflective layers of the retroreflective elements of the retroreflective article are, or include, a dielectric reflecting layer,
    and with the further proviso that for each retroreflective element in which the localized, embedded, metal reflective layer covers the portion of the embedded surface area of the transparent microsphere that is less than the entirety of the embedded surface area of the transparent microsphere, a remaining portion of the embedded surface area of the transparent microsphere that is not covered by the localized, embedded, metal reflective layer, does not comprise any reflective material of any kind between the embedded surface area of the transparent microsphere and the binder.

2. The retroreflective article of claim 1 wherein the article is configured so that at least 60% of the embedded reflective layers of the retroreflective article are localized reflective layers.

3. The retroreflective article of claim 1 wherein the article is configured so that at least some of the localized, embedded reflective layers each cover a portion of the embedded surface area of the transparent microsphere that is at most 25% of the embedded surface area of the transparent microsphere.

4. The retroreflective article of claim 1 wherein the article is configured so that at least some of the localized, embedded reflective layers each cover a portion of the embedded surface area of the transparent microsphere in such manner that the covered portion of the embedded surface area of the transparent microsphere is less than 15% of a total surface area of the transparent microsphere.

5. The retroreflective article of claim 1 wherein the localized, embedded reflective layers each occupy an angular arc of at most 180 degrees.

6. The retroreflective article of claim 1 wherein at least some of the localized, embedded reflective layers occupy an angular arc of, on average, from at least 15 degrees to at most 50 degrees.

7. The retroreflective article of claim 1 wherein the article is configured to comprise at least some transparent microspheres that do not comprise reflective layers disposed thereon, and wherein the transparent microspheres that comprise embedded reflective layers make up from at least 5 percent to at most 95 percent of the total number of transparent microspheres of the retroreflective article.

8. The retroreflective article of claim 1 wherein at least some of the retroreflective elements comprise an intervening layer at least a portion of which is disposed between the transparent microsphere and the binder layer so that a localized, embedded reflective layer is positioned between the intervening layer and the binder layer.

9. The retroreflective article of claim 1 wherein the binder layer comprises a colorant.

10. The retroreflective article of claim 1 wherein at least some of the retroreflective elements comprise a localized layer that is an embedded layer that is embedded between the transparent microsphere and the localized, embedded reflective layer.

11. The retroreflective article of claim 1 wherein the article exhibits an initial coefficient of retroreflectivity ($R_A$, measured at 0.2 degrees observation angle and 5 degrees entrance angle), in the absence of being exposed to a wash cycle, of at least 100 candela per lux per square meter.

12. The retroreflective article of claim 1 wherein the article exhibits a coefficient of retroreflectivity ($R_A$, measured at 0.2 degrees observation angle and 5 degrees entrance angle) after 25 wash cycles, that is at least 30% of an initial coefficient of retroreflectivity in the absence of being exposed to a wash cycle.

13. A transfer article comprising the retroreflective article of claim 1 and a disposable carrier layer on which the retroreflective article is detachably disposed with at least some of the transparent microspheres in contact with the carrier layer.

14. An assembly comprising the retroreflective article of claim 1 and a substrate, wherein the binder layer of the retroreflective article is coupled to the substrate with at least some of the retroreflective elements of the retroreflective article facing away from the substrate.

15. The substrate of claim 14 wherein the substrate is a fabric of a garment.

16. The substrate of claim 14 wherein the substrate is a support layer that is not a fabric of a garment.

17. The retroreflective article of claim 1 wherein at least 50% of the retroreflective elements each comprise a reflective layer that is embedded between the transparent microsphere and the binder layer.

18. The retroreflective article of claim 1 wherein the microspheres are partially embedded in the binder layer so that, on average, from 50 to 80% of the diameters of the microspheres are embedded within the binder layer.

19. The retroreflective article of claim 1 wherein the binder layer comprises nacreous reflective particles at a loading of from at least 0.5 weight percent to at most 6 weight percent, on a dry-solids basis.

20. The retroreflective article of claim 1 wherein the binder layer comprises one or more fluorescent pigments.

* * * * *